(12) United States Patent
Hayashi et al.

(10) Patent No.: US 11,774,651 B2
(45) Date of Patent: Oct. 3, 2023

(54) TERAHERTZ WAVE OPTICAL ELEMENT AND METHOD FOR PRODUCING TERAHERTZ WAVE OPTICAL ELEMENT

(71) Applicant: HAMAMATSU PHOTONICS K.K., Hamamatsu (JP)

(72) Inventors: Shohei Hayashi, Hamamatsu (JP); Tetsushi Shimomura, Hamamatsu (JP); Hiroyasu Fujiwara, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 318 days.

(21) Appl. No.: 17/116,189

(22) Filed: Dec. 9, 2020

(65) Prior Publication Data
US 2021/0191231 A1 Jun. 24, 2021

(30) Foreign Application Priority Data

Dec. 20, 2019 (JP) ................. 2019-230456

(51) Int. Cl.
| | |
|---|---|
| *G02B 5/18* | (2006.01) |
| *G02F 1/39* | (2006.01) |
| *G02B 27/00* | (2006.01) |
| *G02B 3/08* | (2006.01) |

(52) U.S. Cl.
CPC ......... *G02B 5/1871* (2013.01); *G02B 5/1809* (2013.01); *G02B 5/1857* (2013.01); *G02B 5/1876* (2013.01); *G02B 27/0025* (2013.01); *G02F 1/39* (2013.01); *G02B 3/08* (2013.01); *G02F 2203/13* (2013.01)

(58) Field of Classification Search
CPC ...... G02B 5/1871; G02B 5/1866; G02B 5/18; G02B 5/1809; G02B 5/1819; G02B 5/1828; G02B 5/1857; G02B 5/1876; G02B 27/0025; G02B 3/08; G22F 1/39; G22F 2203/13; G02F 1/39; G02F 2203/13

See application file for complete search history.

(56) References Cited

U.S. PATENT DOCUMENTS

| | | | |
|---|---|---|---|
| 2012/0206723 A1* | 8/2012 | Fertig | .............. G01J 4/04 |
| | | | 257/436 |
| 2017/0212285 A1* | 7/2017 | Arbabi | .............. G02B 1/002 |
| 2018/0081265 A1* | 3/2018 | Singh | .............. G03F 7/0002 |

FOREIGN PATENT DOCUMENTS

| | | |
|---|---|---|
| CN | 109459805 A | 3/2019 |
| JP | 2007-057622 A | 3/2007 |
| JP | 2007-328096 A | 12/2007 |
| JP | 2008-014993 A | 1/2008 |
| JP | 2008-112036 A | 5/2008 |
| JP | 2008-139618 A | 6/2008 |

(Continued)

*Primary Examiner* — Christopher Stanford
*Assistant Examiner* — Journey F Sumlar
(74) *Attorney, Agent, or Firm* — Faegre Drinker Biddle & Reath LLP

(57) ABSTRACT

A terahertz wave lens includes a substrate having a surface provided with an uneven structure that changes a phase of the terahertz wave. The uneven structure includes a plurality of holes that are periodically arranged. The uneven structure includes a plurality of regions where the plurality of holes are arranged. A height of the hole in a thickness direction of the substrate and a width of the pillar differ for each of the regions. Outer end portions of the uneven structure in the thickness direction are located on the same plane.

17 Claims, 17 Drawing Sheets

(56) References Cited

FOREIGN PATENT DOCUMENTS

| | | |
|---|---|---|
| JP | 2011-028132 A | 2/2011 |
| JP | 6356557 B2 | 7/2018 |
| JP | 2011-180581 A | 9/2023 |

* cited by examiner

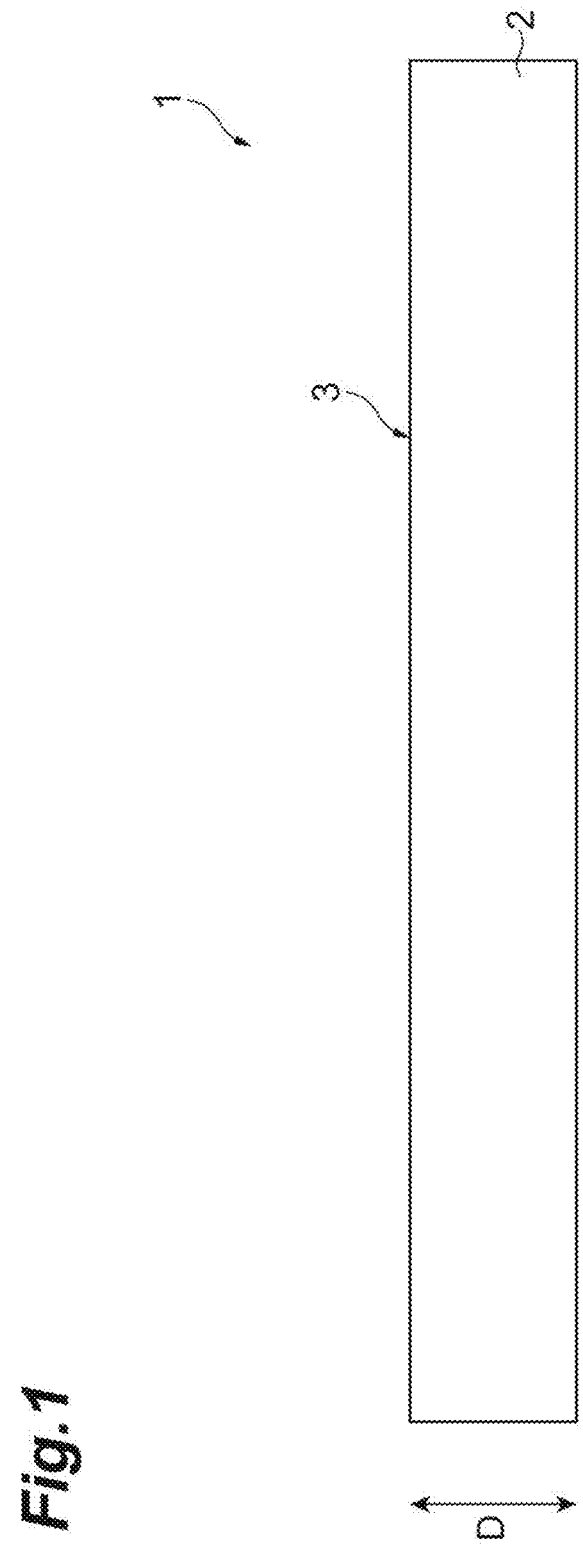

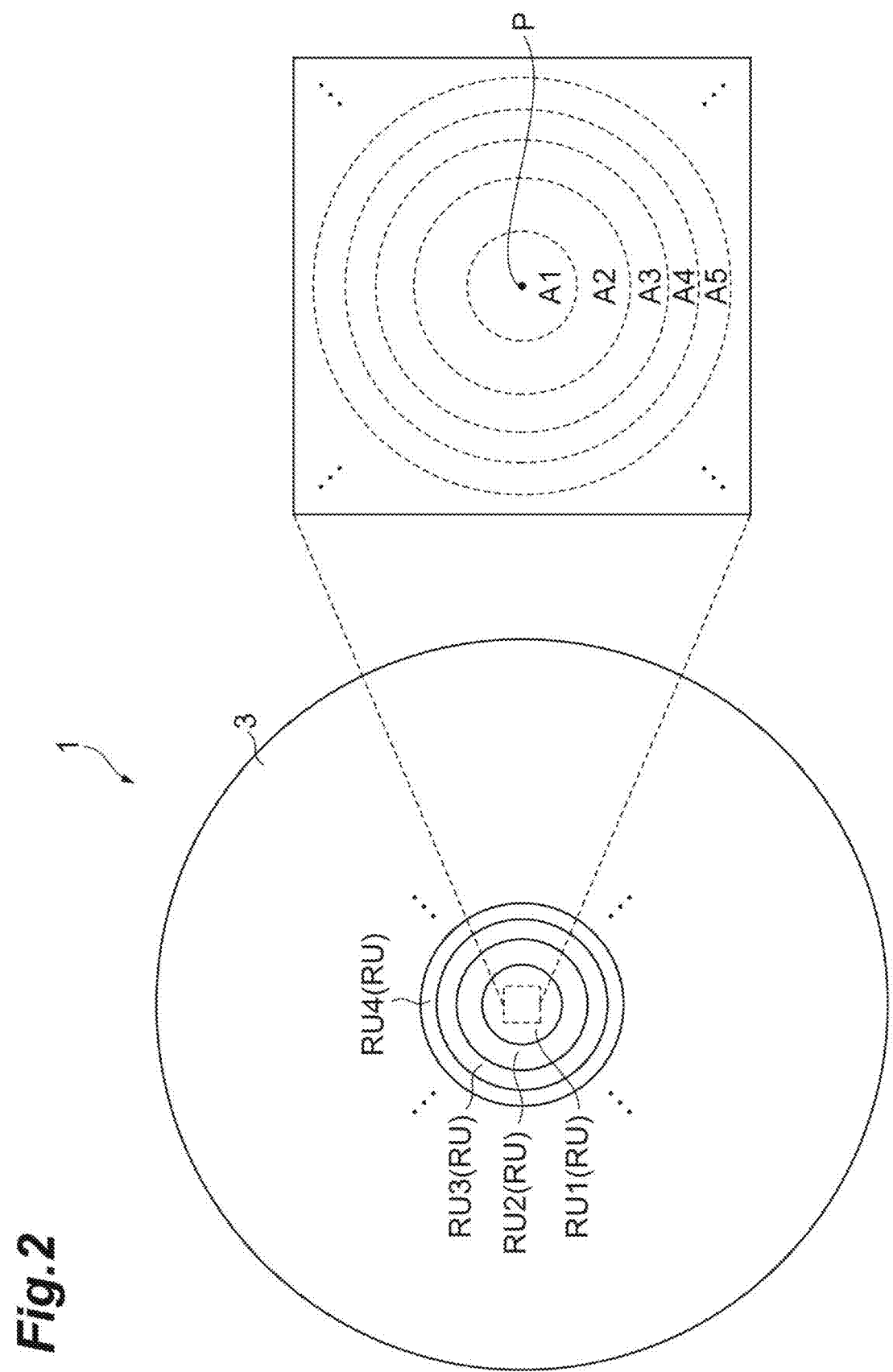

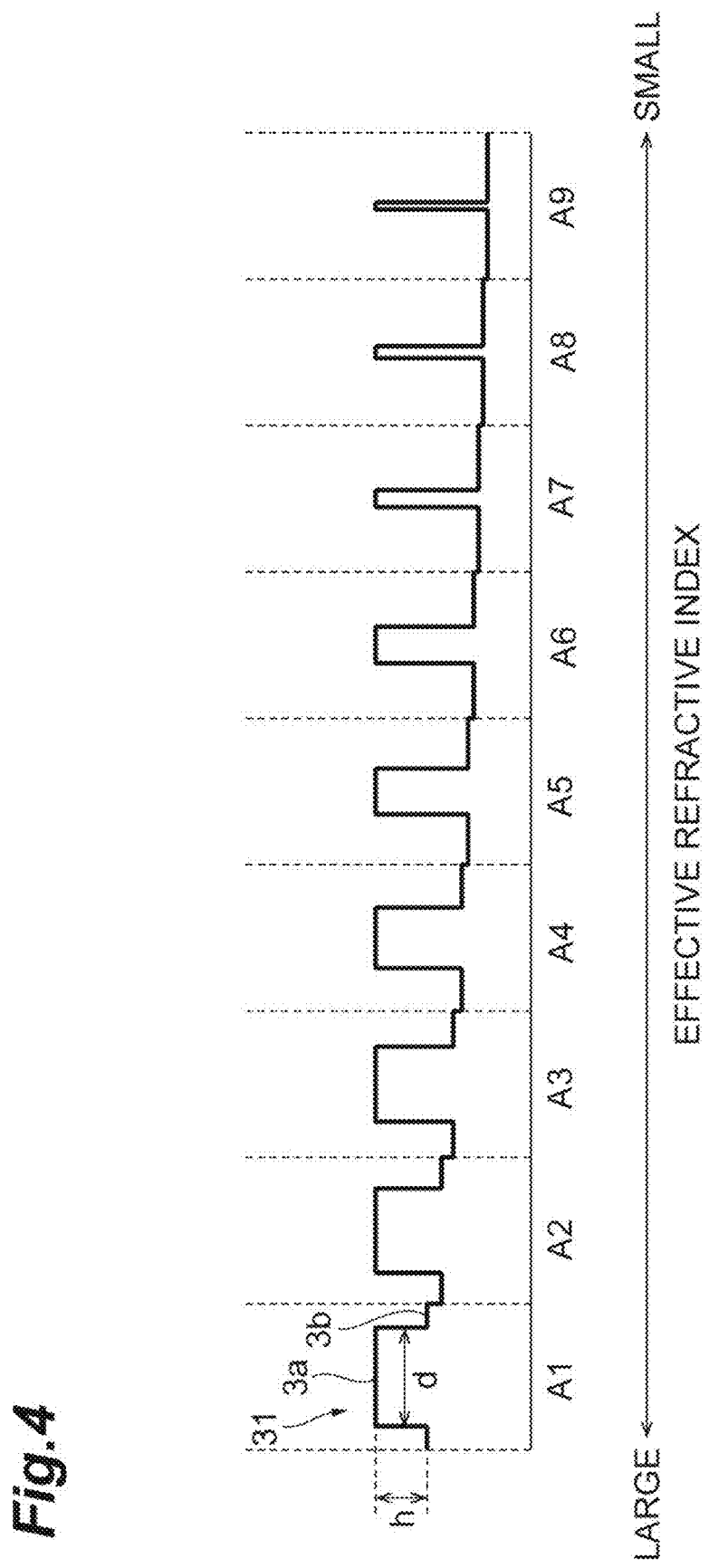

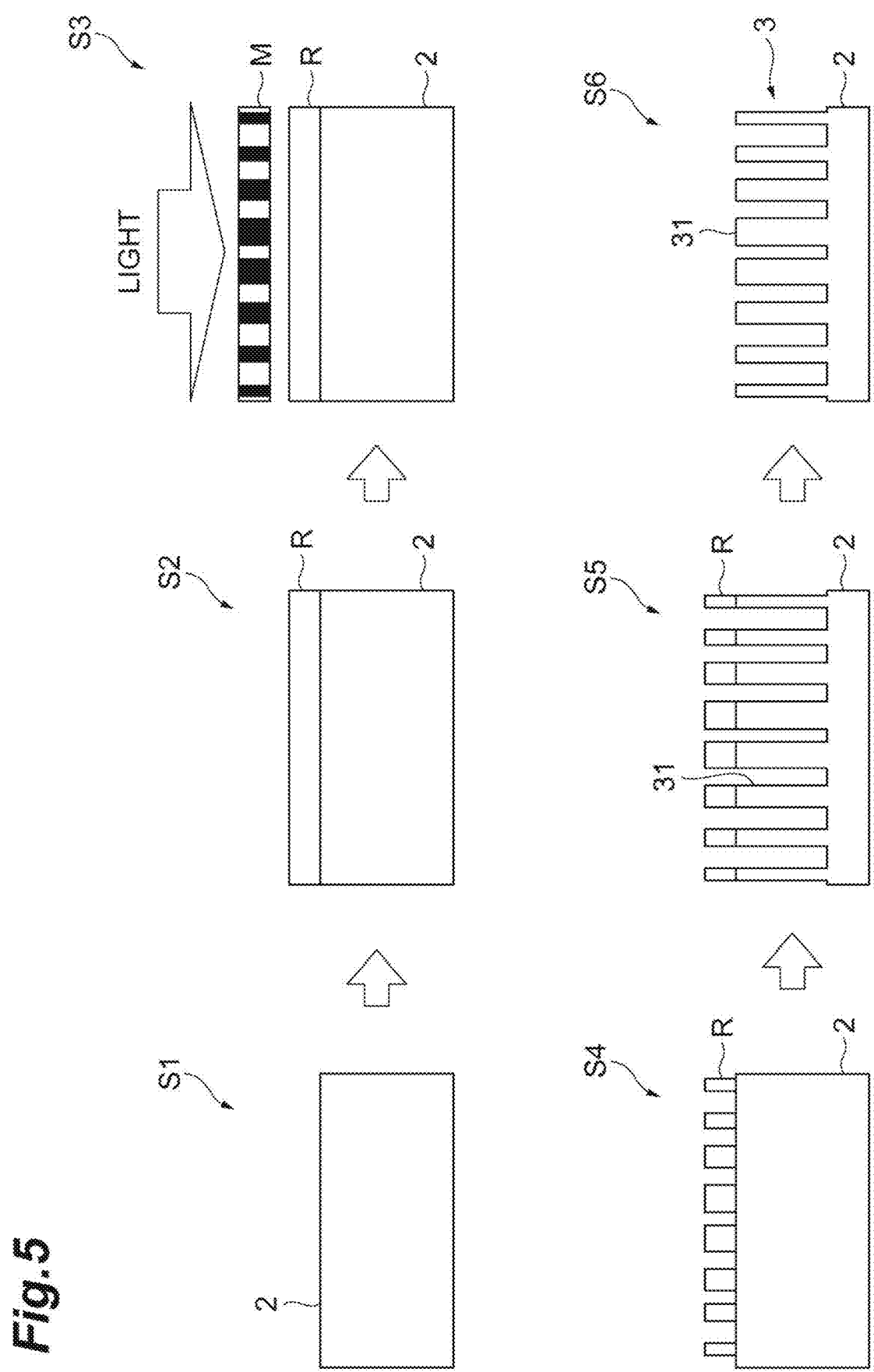

TERAHERTZ WAVE OPTICAL ELEMENT AND METHOD FOR PRODUCING TERAHERTZ WAVE OPTICAL ELEMENT

TECHNICAL FIELD

The present disclosure relates to a terahertz wave optical element and a method for producing a terahertz wave optical element.

BACKGROUND

In recent years, a technique that uses an electromagnetic wave (terahertz wave) in a terahertz band to enable safe and highly accurate analysis has attracted attention. In order to use the terahertz wave, a condensing optical system (lens or the like) that collimates or concentrates the terahertz wave is required. In order to avoid an increase in size of the condensing optical system, it is preferable that a lens as small as possible is used. In the related art, as a lens that is smaller than a spherical lens generally used and can realize a relatively high NA, there has been known a flat lens (metal lens) which has a flat plate shape and in which a fine uneven structure (dielectric uneven structure arrangement) is formed on the surface of a substrate.

For example, Patent Literature 1 (Japanese Patent No. 6356557) discloses a technique by which an SOI substrate in which an etching stopper layer made of $SiO_2$ and a silicon layer made of Si are sequentially formed on a Si substrate is prepared, a mask corresponding to the pattern of an uneven structure is formed on the surface of the silicon layer of the SOI substrate, and portions of the silicon layer which are not covered with the mask are removed by etching; and thereby, the above-described uneven structure is formed. In addition, Patent Literature 2 (Japanese Unexamined Patent Publication No. 2007-57622) discloses a technique by which a method that is a combination of laser interference and laser processing is used to form an uneven structure, in which the height of the structure is spatially modulated, on a substrate.

SUMMARY

According to the technique described in Patent Literature 1, since etching is stopped in a stage where the etching stopper layer is exposed, the height of the uneven structure (namely, the etching depth) can be made uniform. However, since $SiO_2$ used as the etching stopper layer has a property of absorbing light in a terahertz region, $SiO_2$ is not suitable for a terahertz wave optical element. In addition, in the technique described in Patent Literature 2, high brightness processing laser, an interference mask, and the like are required and a process for forming the uneven structure becomes complicated, which is a problem. In addition, since the height of the uneven structure (position of the outermost surface) is irregular, an aberration is likely to occur, which is a problem.

An object of one aspect of the present disclosure is to provide a terahertz wave optical element and a production method of the same which can suppress the occurrence of an aberration while reducing the size.

According to one aspect of the present disclosure, there is provided a terahertz wave optical element including: a substrate having a surface provided with an uneven structure that changes a phase of the terahertz wave. The uneven structure includes a plurality of unevenness forming portions formed of recessed portions that are periodically arranged. The uneven structure includes a plurality of regions where the plurality of unevenness forming portions are arranged. A height of the unevenness forming portion in a thickness direction of the substrate and a width of the unevenness forming portion in a direction orthogonal to the thickness direction differ for each of the regions. Outer end portions of the uneven structure in the thickness direction are located on the same plane.

In the terahertz wave optical element, the height and the width of the unevenness forming portion forming the uneven structure differ for each of the regions. Accordingly, a phase difference that differs for each of the regions can be generated for the terahertz wave transmitted through the substrate. In addition, since the substrate on the surface of which the uneven structure is formed is used to be able to further reduce the thickness of the lens than that of a spherical lens or the like, the size of the lens can be reduced. Furthermore, since the height positions of the outer end portions of the uneven structure in the thickness direction are aligned, the occurrence of an aberration can be suppressed.

A distance between centers of the unevenness forming portions adjacent to each other may be constant. According to the configuration, since the arrangement interval (period) between the unevenness forming portions is constant, the design of the arrangement of the unevenness forming portions is facilitated.

The larger the width of the unevenness forming portion is, the higher the height of the unevenness forming portion may be. According to the configuration, since the microloading effect in etching is used, the uneven structure where the height and the width of the unevenness forming portion differ for each of the regions can be easily formed.

The plurality of regions may be formed of N (N is an integer of 2 or more) regions including a first region to an $N^{th}$ region that are arranged along a predetermined direction. An effective refractive index of each of the plurality of regions may be further decreased in a stepwise manner as the region is shifted from the first region toward the $N^{th}$ region. According to the configuration, since the plurality of regions are arranged such that the effective refractive index is further decreased in a stepwise manner as the region is shifted from the first region toward the $N^{th}$ region, the terahertz wave optical element can serve as a refractive index distribution type lens.

The height of the unevenness forming portion belonging to each of the regions may be further increased as the region is shifted from the first region toward the $N^{th}$ region. According to the configuration, the phase difference between the regions can be more efficiently generated than when only the width of the unevenness forming portion differs for each of the regions.

The plurality of regions may include a first phase difference region where a phase difference between the regions adjacent to each other is set to a first phase difference, and a second phase difference region where a phase difference between the regions adjacent to each other is set to a second phase difference smaller than the first phase difference. According to the configuration, phase distribution design can be more flexibly performed than when the phase differences between the regions are equal.

At least one of the regions, in which the width of the unevenness forming portion in the uneven structure is a threshold value determined in advance or less, may be the second phase difference region. In addition, at least the first region may form the second phase difference region. According to the configuration, for example, when the uneven structure is formed by etching, in a portion in which the microloading effect is relatively remarkable and it is difficult to accurately produce the unevenness forming portion having the width and the height corresponding to a phase distribution designed in advance, the step size of the phase difference between the regions is made small, so that a deviation (production error) of the phase distribution from the design value can be compensated.

The unevenness forming portion may include a plurality of repetition units each including one set of the plurality of regions. The plurality of repetition units may be arranged along the predetermined direction. At least one of the plurality of repetition units may be formed to have a phase distribution having a width larger than $2\pi$. In order to appropriately obtain the lens effect, it is preferable that the repetition unit has a phase distribution having a width of $2\pi$ or more. Meanwhile, due to the above-described production error caused by the microloading effect, the width of the phase distribution of the repetition unit may be smaller than $2\pi$. According to the configuration, it is possible to reduce a possibility that the width of the actual phase distribution is smaller than $2\pi$ in the repetition unit formed to have a phase distribution having a width larger than $2\pi$.

The height and the width of the unevenness forming portion corresponding to each of the plurality of regions may be sized so as to suppress reflection of the terahertz wave at an interface between the uneven structure and air. According to the configuration, since a reflection prevention layer is not required to be provided separately from the unevenness forming portion, the reflection of the terahertz wave at the interface between the uneven structure and air can be suppressed while an increase in size of the terahertz wave optical element is prevented.

According to one aspect of the present disclosure, there is provided a method for producing a terahertz wave optical element, the method including: a first step of determining a pattern of an uneven structure that changes a phase of the terahertz wave; a second step of forming an etching mask, which corresponds to the pattern, on a surface of a substrate that is flat; a third step of performing anisotropic etching on the substrate in a state where the etching mask is formed on the surface of the substrate, to form the uneven structure in the surface of the substrate, the uneven structure including a plurality of unevenness forming portions formed of recessed portions that are periodically arranged; and a fourth step of removing the etching mask from the surface of the substrate. The uneven structure includes a plurality of regions where the plurality of unevenness forming portions are arranged. A height of the unevenness forming portion in a thickness direction of the substrate and a width of the unevenness forming portion in a direction orthogonal to the thickness direction differ for each of the regions.

According to the production method, the terahertz wave optical element exhibiting the above-described effects can be produced. In addition, since the surface of the substrate is etched with the etching mask, the height positions of portions covered with the etching mask (namely, portions that are not removed by etching) can be aligned to a constant position. In addition, since the microloading effect in etching is used, a structure where both of the height and the width of the unevenness forming portion differ for each of the regions can be easily produced.

In the first step, the pattern of the uneven structure may be determined such that a distance between centers of the unevenness forming portions adjacent to each other is constant. According to the configuration, the design of the arrangement of the unevenness forming portions is facilitated.

In the first step, the pattern of the uneven structure may be determined such that the plurality of regions are formed of N (N is an integer of 2 or more) regions including a first region to an $N^{th}$ region that are arranged along a predetermined direction, and an amount of etching per unit area of each of the plurality of regions is further increased in a stepwise manner as the region is shifted from the first region toward the $N^{th}$ region. According to the configuration, the plurality of regions where the effective refractive index is further decreased in a stepwise manner as the region is shifted from the first region toward the $N^{th}$ region can be formed, and the terahertz wave optical element serving as a refractive index distribution type lens can be obtained.

The first step may include a step of acquiring information indicating a relationship between the width of the unevenness forming portion and an etching depth, and a step of determining the width of the unevenness forming portion, which is arranged in each of the regions, based on the information indicating the relationship and a design value of a phase distribution determined in advance. According to the configuration, since the width of the unevenness forming portion of each of the regions is determined in consideration of the relationship between the width of the unevenness forming portion and the etching depth (namely, the magnitude of the influence of the microloading effect), the occurrence of a production error (deviation from the design value) caused by the microloading effect can be suppressed.

In the first step, the width of the unevenness forming portion arranged in each of the regions may be determined such that the plurality of regions include a first phase difference region and a second phase difference region. The first phase difference region is a region where a phase difference between the regions adjacent to each other is set to a first phase difference. The second phase difference region is a region where a phase difference between the regions adjacent to each other is set to a second phase difference smaller than the first phase difference. According to the configuration, phase distribution design can be more flexibly performed than when the phase differences between the regions are equal.

In the first step, the width of the unevenness forming portion arranged in each of the regions may be determined such that at least one of the regions, in which the width of the unevenness forming portion in the uneven structure is a threshold value determined in advance or less, is the second phase difference region. In addition, in the first step, the width of the unevenness forming portion arranged in each of the regions may be determined such that at least the first region forms the second phase difference region. According to the configuration, in a portion in which the microloading effect is relatively remarkable and it is difficult to accurately produce the unevenness forming portion having the width and the height corresponding to a phase distribution designed in advance, the step size of the phase difference between the regions is made small, so that a deviation (production error) of the phase distribution from the design value can be compensated.

In the first step, the width of the unevenness forming portion arranged in each of the regions may be determined such that the unevenness forming portion includes a plurality of repetition units each including one set of the plurality of regions, the plurality of repetition units are arranged along the predetermined direction, and at least one of the plurality of repetition units has a phase distribution having a width larger than $2\pi$. According to the configuration, it is possible to obtain the terahertz wave optical element which reduces a possibility that the width of the actual phase distribution is smaller than 2π in the repetition unit formed to have a phase distribution having a width larger than 2π.

In the first step, the width of the unevenness forming portion arranged in each of the regions may be determined such that the height and the width of the unevenness forming portion corresponding to each of the plurality of regions are sized so as to suppress reflection of the terahertz wave at an interface between the uneven structure and air. According to the configuration, since a reflection prevention layer is not required to be provided separately from the unevenness forming portion, it is possible to obtain the terahertz wave optical element that can suppress the reflection of the terahertz wave at the interface between the uneven structure and air while preventing an increase in size of the terahertz wave optical element.

According to one aspect of the present disclosure, it is possible to provide a terahertz wave optical element and a production method of the same which can suppress the occurrence of an aberration while reducing the size.

BRIEF DESCRIPTION OF THE DRAWINGS

FIG. 1 is a side view of a terahertz wave lens of one embodiment.

FIG. 2 is a plan view of the terahertz wave lens illustrated in FIG. 1.

FIG. 4 is a view illustrating the heights and the diameters of pillars included in regions of the uneven structure.

FIG. 5 is a view illustrating a production process of the terahertz wave lens.

DETAILED DESCRIPTION

Hereinafter, an embodiment of the present disclosure will be described in detail with reference to the accompanying drawings. In the description of the drawings, the same reference signs will be used for the same or equivalent components, and duplicated descriptions will be omitted.

[Terahertz Wave Lens]

As illustrated in FIGS. 1, 2, 3A, and 3B, a terahertz wave lens 1 of one embodiment is a terahertz wave optical element that can be used for an electromagnetic wave in a terahertz band (hereinafter, "terahertz wave"). Specifically, the terahertz wave lens 1 is a lens that transmits a terahertz wave of a predetermined frequency without depending on a polarization direction, to concentrates or collimates the terahertz wave. The terahertz wave lens 1 is formed of a flat optical element (so-called metal lens) using a fine dielectric uneven structure arrangement. In the present embodiment, as one example, the above predetermined frequency is 2.4 THz (wavelength of 125 μm), and the focal distance of the terahertz wave lens 1 is 40 mm.

The terahertz wave lens 1 includes a substrate 2 having a disk shape. The substrate 2 is made of a material (for example, silicon or the like) that is transparent in a terahertz region. In the present embodiment, the substrate 2 is made of high-resistance silicon. In the present embodiment, as one example, the diameter of the substrate 2 is mm. The thickness of the substrate 2 is, for example, approximately 0.5 mm to 1 mm. A fine uneven structure 3 is formed in one main surface (surface) of the substrate 2, the one main surface intersecting a thickness direction D of the substrate 2. The uneven structure 3 serves as a phase modulation layer that changes the phase of a terahertz wave which is transmitted through the uneven structure 3.

Figure 3A:
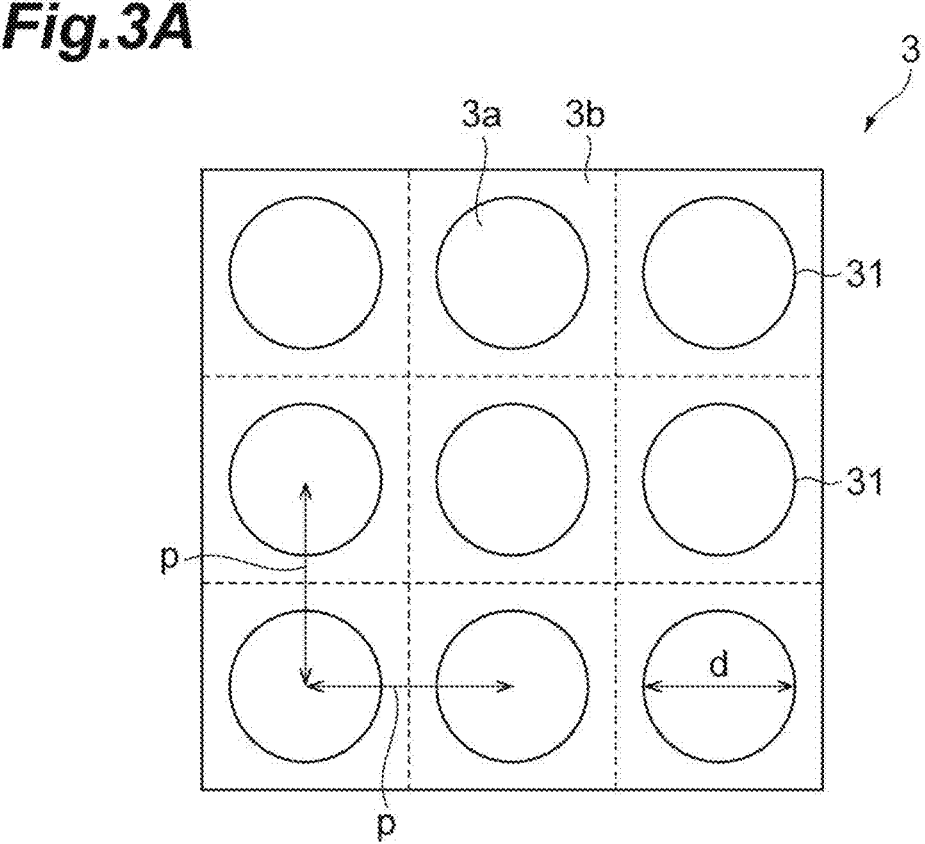
FIG. 3A is a plan view illustrating a part of an uneven structure of the terahertz wave lens.
Figure 3B:
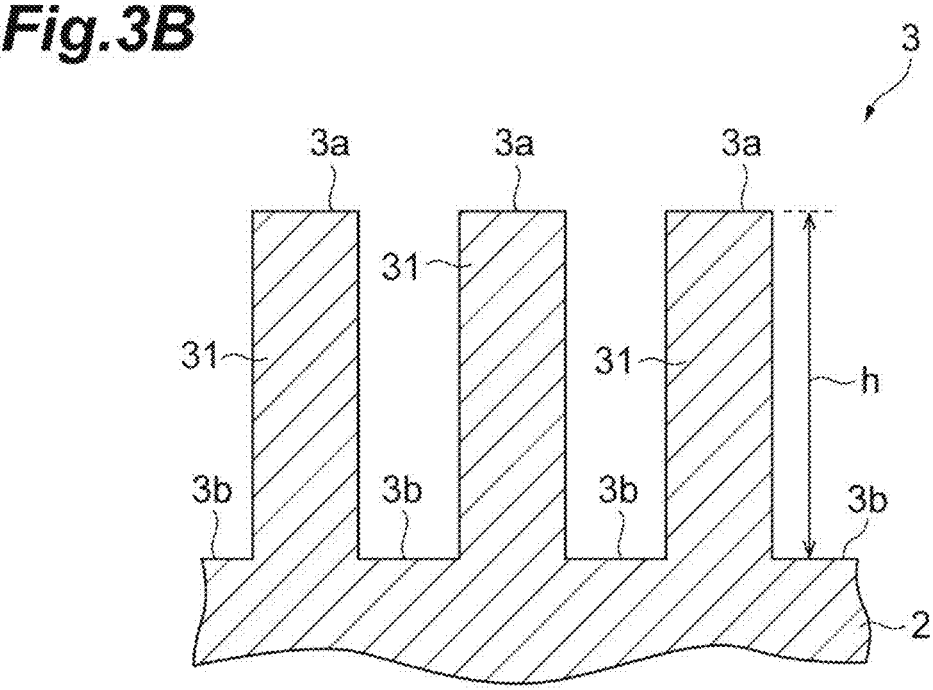
FIG. 3B is a side cross-sectional view of a part of the uneven structure.

The uneven structure 3 includes a plurality of pillars 31 (unevenness forming portions) that are periodically arranged. As illustrated in FIGS. 3A and 3B, in the present embodiment, as one example, the pillar 31 is formed of a protruding portion that has a columnar shape and stands on the surface (bottom portion 3b to be described later) of the substrate 2. As illustrated in FIG. 3A, the plurality of pillars 31 are periodically arranged. Specifically, the plurality of pillars 31 are arranged such that the distance (period p) between the centers of the pillars 31 adjacent to each other is constant over the entirety of the uneven structure 3. In the present embodiment, the plurality of pillars 31 are arranged in a grid pattern. The period p is set to a period (subwavelength period) smaller than the wavelength (in the present embodiment, 125 μm) of a terahertz wave to be operated. In the present embodiment, as one example, the period p is 30 μm. As described above, the uneven structure 3 is formed of periodic structures (in the present embodiment, square regions (regions surrounded by the broken line of FIG. 3A) each including one pillar 31 in a central portion) having the same area.

Upper surfaces of the plurality of pillars 31 form outer end portions 3a of the uneven structure 3 in the thickness direction D. The outer end portions 3a (namely, the upper surfaces of the plurality of pillars 31) of the uneven structure 3 are located on the same plane. The uneven structure 3 includes the bottom portions 3b, which are located inward from the outer end portions 3a, in portions (namely, portions in which the pillars 31 are not formed) between the plurality of pillars 31. The length in the thickness direction D between the upper surface (outer end portion 3a) of the pillar 31 and the bottom portion 3b that surrounds the pillar 31 when viewed in the thickness direction D is defined as a height h (refer to FIG. 3B) of the pillar 31.

As illustrated in FIG. 2, the uneven structure 3 has a structure where repetition units RU in which a phase difference of $2\pi$ or more (unit is radian (rad) and in the following description, the unit (rad) of the phase difference will be appropriately omitted) can be generated are repeatedly arranged in a plane. In the present embodiment, the uneven structure 3 includes a plurality of repetition units $RU_1$ to $RU_K$ that are arranged along a radial direction (predetermined direction) from a center P of the substrate 2 toward an outer edge of the substrate 2 when viewed in the thickness direction D. Here, K is the number of repetitions (namely, the number of the repetition units RU included in the uneven structure 3), and is an integer of 2 or more. A first repetition unit $RU_1$ including the center P is a circular region around the center P. The second and subsequent repetition units $RU_2$ to $RU_K$ are annular regions around the center P. The width (length in the radial direction) of the plurality of repetition units RU is further decreased gradually as the repetition unit RU is away from the center P. With such a repetition structure, similar to a Fresnel lens, a phase difference of "$2\pi \times K$" can be generated from the center P of the substrate 2 along the radial direction. Namely, the thickness of the lens is further suppressed than a spherical lens and a Fresnel lens by the substrate 2 including a flat surface having the uneven structure 3 which is fine; and thereby, the size can be reduced. In addition, the lens having a high NA can be realized.

Each of the repetition units RU includes a plurality of regions (a first region to an $N^{th}$ region) that are arranged in the radial direction from a center P side toward an outer edge side of the substrate 2. Here, N is the number of regions included in one repetition unit RU, and is an integer of 2 or more. In the present embodiment, as one example, N is 9. Namely, each of the repetition units RU includes nine regions A1 to A9. As illustrated in FIG. 3A, the plurality of pillars 31 are periodically arranged in each of the regions A1 to A9.

In the plurality of pillars 31 arranged in the same region, the heights h in the thickness direction D coincide with each other and the widths (in the present embodiment, diameters d (refer to FIG. 3A)) in a direction orthogonal to the thickness direction D coincide with each other in design. Namely, in the same region, the plurality of pillars 31 of which the heights h and the diameters d are uniform are periodically arranged. Meanwhile, the heights h and the diameters d of the pillars 31 differ between different regions of the same repetition unit RU. Namely, the height h and the diameter d of the pillar 31 differ for each region.

As illustrated in FIG. 4, the diameter d of the pillar 31 belonging to each of the regions A1 to A9 is adjusted such that the filling rate (namely, an area occupied by the pillar 31 per unit area) of the material (in the present embodiment, high-resistance silicon) of the substrate 2 in each of the regions A1 to A9 is further decreased as the region is shifted from the region A1 toward the region A9. Namely, the diameter d of the pillar 31 belonging to each of the regions A1 to A9 is further decreased as the region is shifted from the region A1 toward the region A9. In a region where the pillar 31 described above is formed, the terahertz wave senses an average refractive index (effective refractive index) of the refractive index of the portion of the pillar 31 (portion formed of high-resistance silicon that is the material of the substrate 2) and the refractive index of an air layer (layer having a lower refractive index than that of the material of the substrate 2) around the pillar 31. As described above, the diameter d of the pillar 31 belonging to each of the regions A1 to A9 (namely, the filling rate of silicon in each of the regions A1 to A9) is adjusted, and thus the effective refractive index of the regions A1 to A9 is further decreased in a stepwise manner as the region is shifted from the region A1 toward the region A9. The effective refractive index differs for each region, so that a phase difference can be generated between the regions.

In addition, the height h of the pillar 31 belonging to each of the regions A1 to A9 is further increased as the region is shifted from the region A1 toward the region A9. As described above, the height positions (positions in the thickness direction D) of the upper surfaces (outer end portions 3a) of the plurality of pillars 31 are aligned. Therefore, the height positions of the bottom portions 3b of the regions A1 to A9 are further moved toward the inside of the substrate 2 as the region is shifted from the region A1 toward the region A9. As described above, since the diameter d of the pillar 31 differs for each region, the effective refractive indexes of the regions A1 to A9 differ from each other, and the thickness of the uneven structure 3 (namely, the height h of the pillar 31) differs for each region, so that the phase difference between the regions can be further increased.

The height h of the pillar 31 is set to, for example, approximately one wavelength (125 µm) of the terahertz wave to be operated. However, the height h of the pillar 31 differs for each of the regions A1 to A9 due to a microloading effect occurring during etching to be described later. In the present embodiment, as one example, in each of the repetition units RU, the maximum value of the heights h of the pillars 31 (namely, the height h of the pillar 31 belonging to the region A9) is approximately 120 µm, and the minimum value of the heights h of the pillars 31 (namely, the height h of the pillar 31 belonging to the region A1) is approximately 95 µm. In addition, the maximum value of the diameters d of the pillars 31 (namely, the diameter d of the pillar 31 belonging to the region A1) is approximately 25 µm, and the minimum value of the diameters d of the pillars 31 (namely, the diameter d of the pillar 31 belonging to the region A9) is approximately 13 µm.

As illustrated in FIG. 5, the uneven structure 3 described above can be produced by using, for example, a photolithography technology. First, the substrate 2 having a flat surface before the uneven structure 3 is formed is prepared (S1). Subsequently, a photoresist R is applied to the surface of the substrate 2 (S2). Subsequently, the photoresist R on the substrate 2 is exposed using a photomask M provided with a pattern corresponding to a plurality circular patterns (namely, patterns corresponding to regions occupied by the plurality of pillars 31) having the diameters d and a distribution which are designed in advance (S3). Accordingly, when the photoresist R is a negative type, exposed portions of the photoresist R remains, and when the photoresist R is a positive type, the exposed portions of the photoresist R are removed. When the photoresist R is a negative type, the photomask M provided with a pattern through which light passes only at positions corresponding to the plurality of circular patterns described above may be used. Meanwhile, when the photoresist R is a positive type, the photomask M provided with a pattern which blocks light only at the positions corresponding to the plurality of circular patterns described above may be used. With the above process, the photoresist R remaining on the substrate 2 forms an etching mask.

Subsequently, anisotropic etching (anisotropic dry etching) is performed using the photoresist R remaining on the substrate 2 as an etching mask (S5). Accordingly, portions (silicon regions) of the substrate 2, the portions not being covered with the photoresist R, are removed. FIG. 5 is a view schematically illustrating a production procedure of the uneven structure 3, and the etching depth is illustrated as being constant regardless of the diameters of the pillars 31. However, actually, the narrower the gap between the pillars 31 adjacent to each other is, the shallower the etching depth is. This phenomenon is commonly known as the microloading effect. In the present embodiment, as described above, the uneven structure 3 includes a pillar 31 group which is configured such that not only the diameter d but also the depth (height h) differ for each of the regions A1 to A9. The pillar 31 group configured in such a manner is formed by using the microloading effect. Namely, the diameter d of the pillar 31 belonging to each of the regions A1 to A9 is determined upon consideration of the influence of the microloading effect in advance. Accordingly, a desired phase difference (namely, a phase difference determined by a combination of the diameter d and the height h of the pillar 31) can be set for each of the regions A1 to A9. Namely, the diameter d of the pillar 31 belonging to each of the regions A1 to A9 is determined such that a combination of the diameter d and the height h of the pillar 31 required to obtain the desired phase difference in each of the regions A1 to A9 is obtained.

Subsequently, the photoresist R remaining on the substrate 2 is removed (S6). With the above process, the terahertz wave lens 1 in which the uneven structure 3 described above is formed in the surface of the substrate 2 is obtained.

Figure 6:
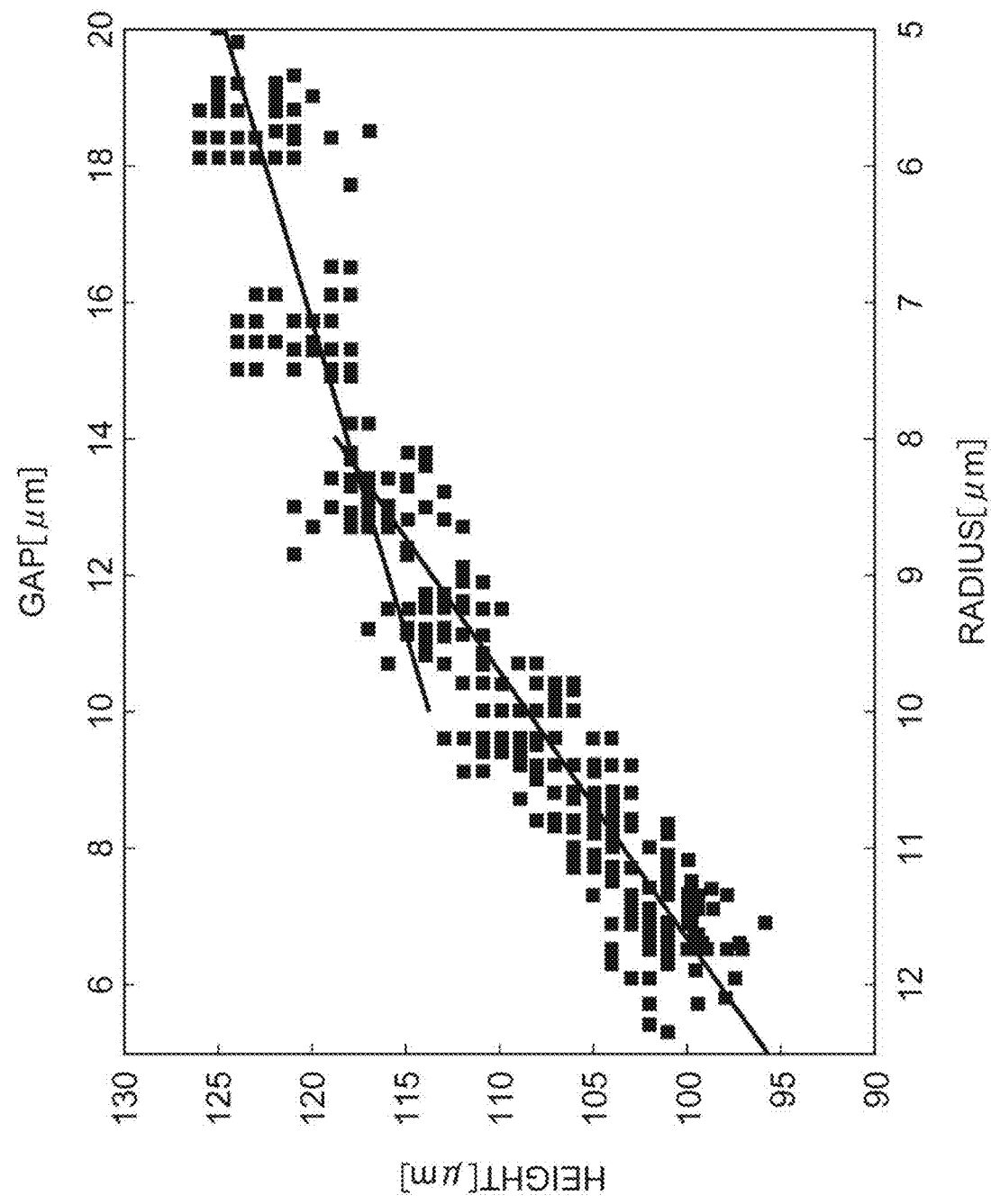
FIG. 6 is a graph showing one example of a relationship between the pillar radius (gap between pillars) and the pillar height caused by a microloading effect.

A design (design of the diameter d of the pillar 31 belonging to each of the regions A1 to A9) that takes into consideration the above-described microloading effect will be described in more detail with reference to FIGS. 6 and 7. FIG. 6 shows a relationship between the radius of the pillar 31 and the etching depth (height), which is obtained in experiments performed using a predetermined etching condition by the inventors. More specifically, FIG. 6 shows results (etching depths) of performing etching for a plurality of variations of the pillar radius, the variations being included in a range of 5 μm to 12.5 μm, using an etching condition where when the radius of the pillar 31 is 5 μm (namely, when the gap between the pillars 31 adjacent to each other is 20 μm) such that the etching depth is 125 μm. It is found that the microloading effect (namely, the ratio of the amount of change in pillar height to the amount of change in pillar radius) is remarkable when the radius of the pillar 31 is in a range of 9 μm or more (gap between the pillars 31 is 12 μm or less) under the etching condition used in the experiments.

When etching (experiment) is performed in advance on the same processing target (substrate 2) using the same etching condition as that of etching to be performed in the production step (S5), a relationship between the diameter d of the pillar 31 (namely, the gap between the pillars 31) and the microloading effect as shown in FIG. 6 can be identified in advance. Incidentally, when the period p of the pillars 31 in the uneven structure 3 is constant as in the present embodiment, such a relationship is uniquely identified. Specifically, as described above, the degree of the microloading effect depends on the gap between the pillars 31 adjacent to each other. Meanwhile, in the present embodiment, since the period p of the pillars 31 in the uneven structure 3 is constant, a relationship that "the gap between the pillars 31 adjacent to each other=the period p−the diameter d" is established. Accordingly, the degree of the microloading effect and the diameter d of the pillar 31 can be one-to-one correlated.

Figure 7:
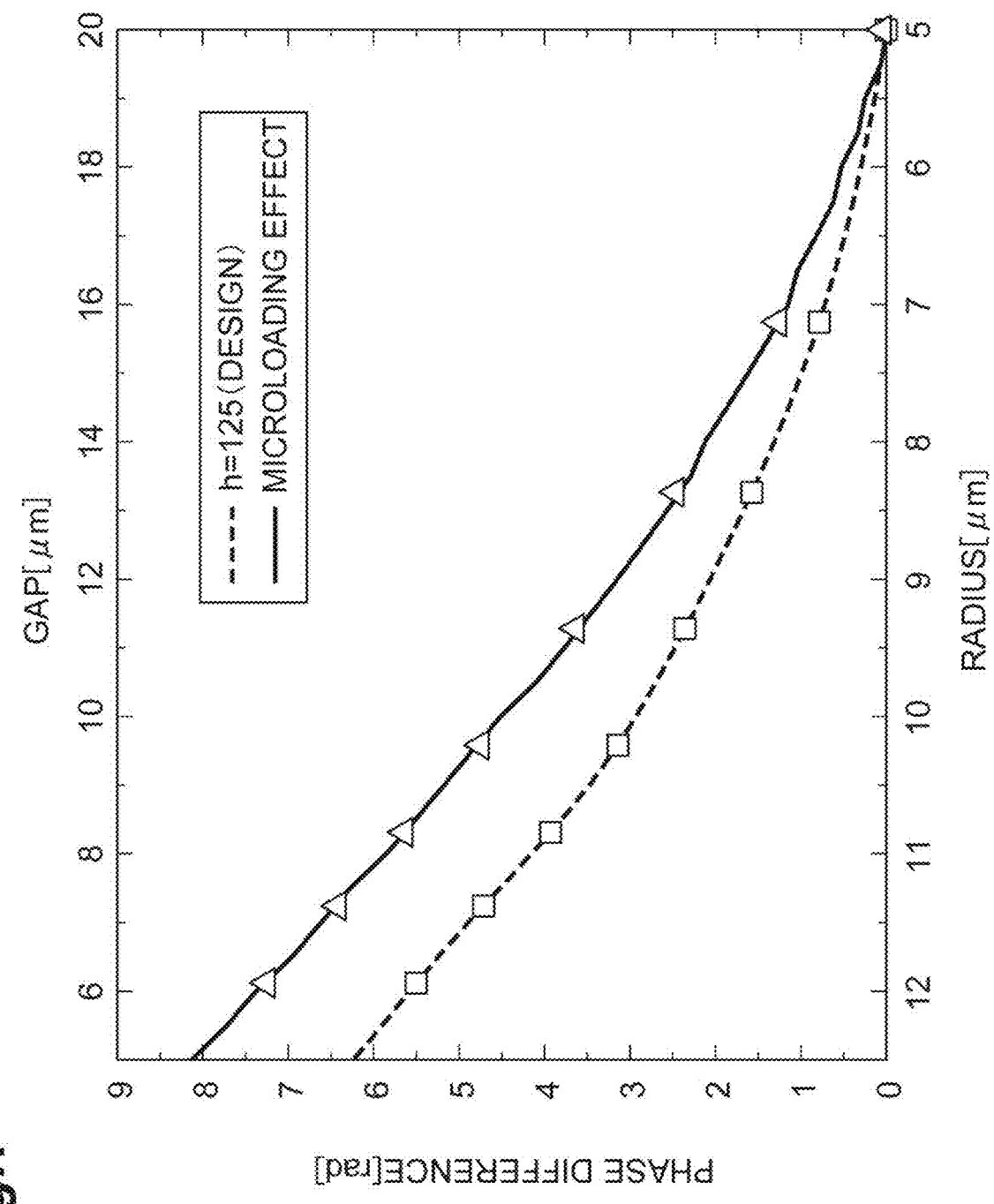
FIG. 7 is a graph showing a phase shift (shift from a design value) caused by the non-uniformity in pillar height.

The broken line of FIG. 7 indicates a phase difference that is calculated based on the assumption that the height h (namely, etching depth) is constant (125 μm) regardless of the radius of the pillar 31. Namely, the broken line of FIG. 7 indicates a phase difference that is calculated without consideration of the influence of the microloading effect. Incidentally, the phase difference in FIG. 7 is a phase difference based on the phase (0 rad) of a region where the pillars 31 each having a radius of 5 mm and a height of 125 μm are periodically arranged.

Meanwhile, the solid line of FIG. 7 indicates a phase difference that is calculated in consideration of the influence of the microloading effect. Namely, the solid line indicates a phase difference that is calculated using the height h of the pillar 31, the height h being obtained from the relationship shown in FIG. 6 and the radius of the pillar 31.

For example, when the material (namely, a region to be removed by etching) of the uneven structure and the material of the substrate which is a foundation differ from each other, the etching is stopped on the surface of the substrate, so that the height of each of the pillars forming the uneven structure is constant. In such a case, the microloading effect is not required to be considered. However, as in the present embodiment, when the uneven structure is formed in the surface of the substrate itself, and regions where the microloading effect is remarkable (in the example of FIG. 6, regions where the gap is 12 μm or less) and regions where the microloading effect is not remarkable (in the example of FIG. 6, regions where the gap is 12 μm or more) are mixed, there occurs a difference in height h (etching depth) of the pillar 31 between the regions A1 to A9. Namely, as shown in FIG. 7, when the microloading effect is ignored (namely, based on the broken line of FIG. 7) and the diameter d of the pillar 31 belonging to each of the regions A1 to A9 is set such that the phase difference of each of the regions A1 to A9 is a desired value, the actually obtained phase difference (namely, the phase difference indicated by the solid line of FIG. 7) of each of the regions A1 to A9 deviates from the desired value.

Therefore, in the present embodiment, information indicating the relationship between the radius (or the diameter d) of the pillar 31 and the height h of the pillar 31 obtained by etching, as shown in FIG. 6, is acquired in advance. Then, the diameter d of the pillar 31 belonging to each of the regions A1 to A9 is determined based on the information indicating the above relationship and the design value (namely, a phase difference assigned to each of the regions A1 to A9) of a phase distribution determined in advance. Namely, the diameter d of the pillar 31 belonging to each of the regions A1 to A9 is determined such that the phase difference of each of the regions A1 to A9, which is determined by a combination of the height h and the diameter d of the pillar 31 belonging to each of the regions A1 to A9, is the desired value (design value). Then, in the above-described production process, an etching mask (the photoresist R remaining on the surface of the substrate 2) is formed by using the photomask M in which the diameter d of the pillar 31 belonging to each of the regions A1 to A9 is reflected, the diameter d being determined in such a manner (S3 and S4 of FIG. 5), anisotropic etching (S5 of FIG. 5) is performed, and finally, the etching mask is removed (S6 of FIG. 5). Accordingly, the terahertz wave lens 1 having the phase distribution as designed can be obtained. Namely, in each of the repetition units RU, the regions A1 to A9 having the phase distribution as designed can be formed.

Figure 8:
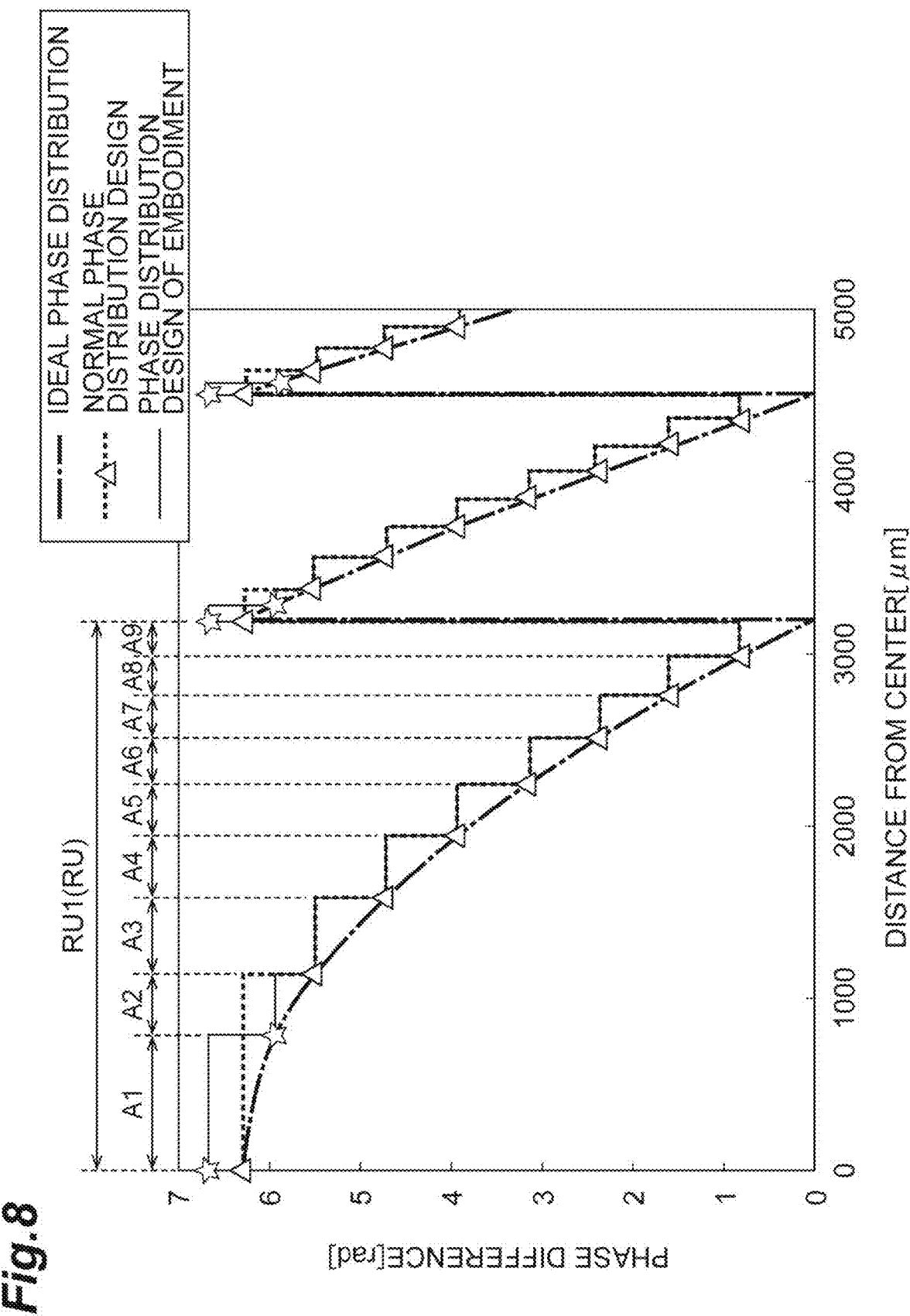
FIG. 8 is a graph showing phase distribution design of the present embodiment, normal phase distribution design, and an ideal phase distribution.

FIG. 8 is a graph showing phase distribution design of the present embodiment, normal phase distribution design, and an ideal phase distribution. In FIG. 8, the ideal phase distribution indicated by the alternate long and short dash line is determined based on a wavelength λ (in the present embodiment, 125 µm) of a terahertz wave to be operated, a focal distance f (in the present embodiment, 40 mm) of the lens, a distance r from the center (center P) of the lens, and the following equation (1). The ideal phase distribution determined by the following equation (1) is a phase distribution where the phase is wrapped every 2π (≈6.28 rad). Incidentally, the phase difference shown in FIG. 8 is a value based on a phase difference (=0) corresponding to the boundary between the repetition units every 2π.

$$\varphi(\lambda, f, r) = -\frac{2\pi}{\lambda}\left(\sqrt{r^2 + f^2} - f\right) \quad (1)$$

In the normal phase distribution design indicated by the broken line in FIG. 8, 2π is divided into approximately eight sections such that the ideal phase distribution is approximated, and a sub-wavelength structure suitable for each of the sections is assigned. Namely, in each of the repetition units every 2π, regions having eight different phase differences are formed with a step of π/4.

In the phase distribution design of the present embodiment indicated by the solid line in FIG. 8, as described above, the regions A1 to A9 having nine different phase differences are formed. Specifically, the repetition unit RU (one set of a plurality of the regions A1 to A9) includes first phase difference regions where the phase difference between the regions adjacent to each other is set to π/4 (first phase difference), and second phase difference regions where the phase difference between the regions adjacent to each other is set to a phase difference (second phase difference) smaller than π/4. In the present embodiment, as one example, regions where the microloading effect is not remarkable (in the present embodiment, as one example, the regions A3 to A9) are formed as the first phase difference regions, and regions where the microloading effect is remarkable (in the present embodiment, as one example, the regions A1 and A2) are formed as the second phase difference regions.

The region where the microloading effect is remarkable is, for example, a region where the diameter d of the pillar 31 is a threshold value Δd determined in advance or more (namely, a region where the gap between the pillars 31 is a certain value or less). For example, in the example of FIG. 6, as described above, the microloading effect is remarkable in regions where the radius of the pillar 31 is 9 µm or more (namely, the diameter d is 18 µm or more). In such a case, the threshold value Δd can be set to, for example, 18 µm.

As described above, the phase is equally divided in the normal phase distribution design, whereas in the phase distribution design of the present embodiment, the number of divisions of the phase is further increased in the regions where the microloading effect is remarkable than in the regions where the microloading effect is not remarkable. In a portion in which the microloading effect is relatively remarkable and it is difficult to accurately produce the pillar 31 having the diameter d and the height h corresponding to the phase distribution designed in advance, the step size of the phase difference between regions is made small, so that a deviation (production error) of the phase distribution from the design value can be compensated.

Incidentally, as described above, the width (length in the radial direction) of the plurality of repetition units RU is further decreased gradually as the repetition unit RU is away from the center P. Namely, the width of each of the plurality of regions included in the repetition unit RU is further decreased gradually as the region is away from the center P. For this reason, for example, there is a case where in the repetition unit RU which is located in the vicinity of the outer edge of the substrate 2 and has a very small width, it is difficult to increase the number of deviations of the phase even in a region where the diameter d of the pillar 31 is the threshold value Δd or more. In such a repetition unit RU, the number of divisions of the phase in a region where the diameter d of the pillar 31 is a predetermined value or more is not necessarily required to be increased. For example, the repetition unit RU in the vicinity of the outer edge of the substrate 2 may have eight regions having a phase difference every π/4 designed according to the normal phase distribution design.

In addition, in the phase distribution design of the present embodiment, the repetition unit RU is formed to have a phase distribution having a width larger than 2π. Specifically, in the normal phase distribution design, the phase difference of regions having the maximum phase difference (regions corresponding to the regions A1 and A2 in the phase distribution design of the present embodiment) coincides with 2π such that the ideal phase distribution (namely, the phase distribution having a width of 2π) which is wrapped every 2π is approximated. On the other hand, in the phase distribution design of the present embodiment, the height h and the diameter d of the pillar 31 belonging to the region A1 are adjusted that the phase difference of the region A1 having the maximum phase difference is larger than 2π. In order to appropriately obtain the lens effect, it is preferable that the repetition unit RU has a phase distribution having a width of 2π or more. Meanwhile, due to the above-described production error caused by the microloading effect, the width of the phase distribution of the repetition unit RU may be smaller than 2π. Therefore, in the present embodiment, the repetition unit RU is formed to have a phase distribution having a width larger than 2π. Accordingly, a possibility that the width of the actual phase distribution of the repetition unit RU is smaller than 2π can be reduced.

In the present embodiment, as one example, the phase difference of the region A2 is set to π/8 with respect to the region A3, and the phase difference of the region A1 is set to a magnitude between π/8 and π/4 with respect to the region A2. Accordingly, the repetition unit RU has a phase distribution having a width larger than 2π in the entirety of the regions A1 to A9.

Figure 9:
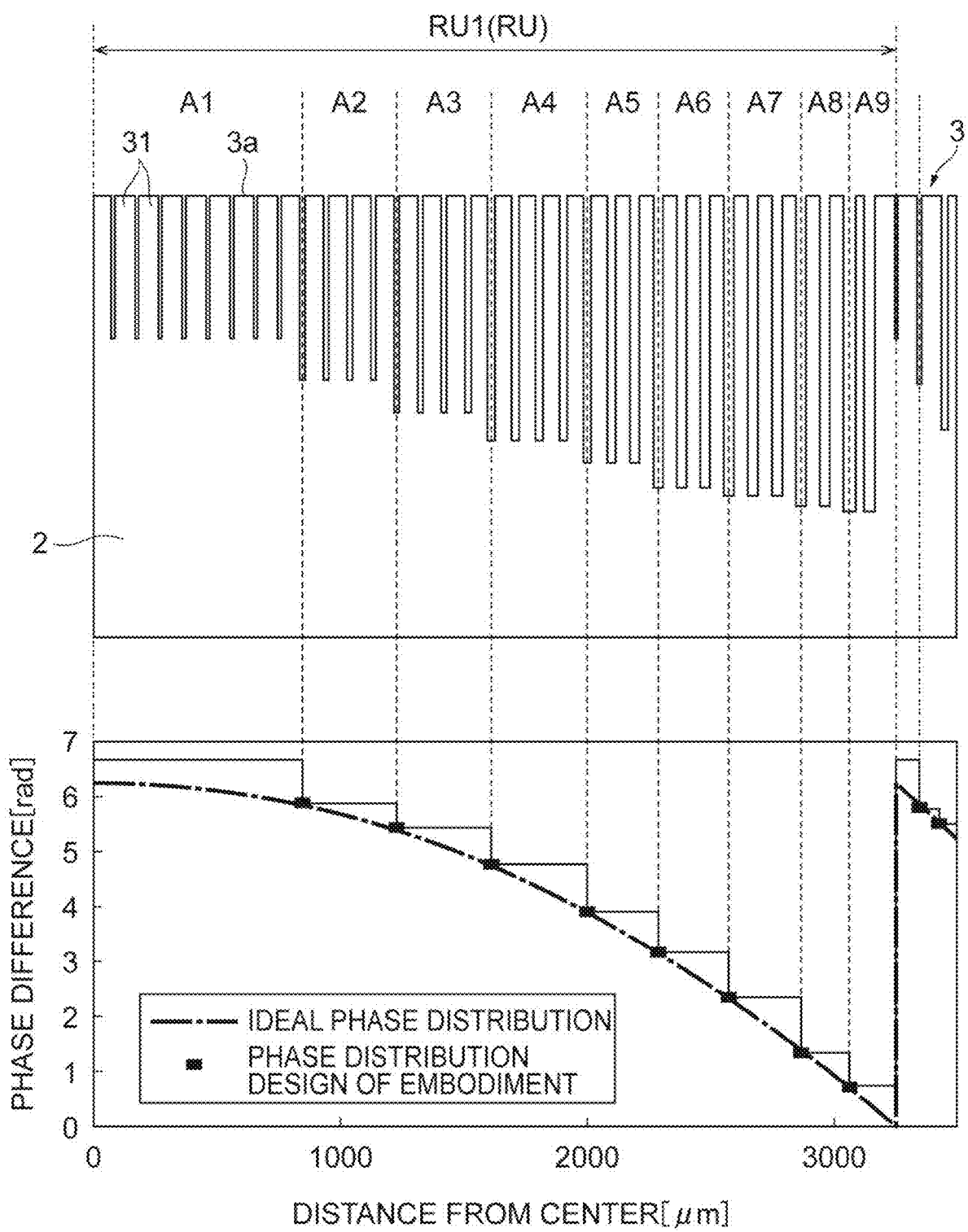
FIG. 9 is a chart schematically showing a part of an uneven structure corresponding to the phase distribution design.

FIG. 9 is a chart schematically showing a correspondence between the uneven structure 3 formed based on the above-described phase distribution design and the phase difference (phase distribution). In FIG. 9, the diameters d of the pillars 31 are illustrated as being larger than actual diameters. For this reason, the number of the pillars 31 belonging to each of the regions A1 to A9 shown in FIG. 9 (the number of the pillars 31 along the radial direction of the substrate 2) differs from the actual number of the pillars 31. Actually, each of the regions A1 to A9 includes a larger number of the pillars 31 than the number of the pillars 31 shown in FIG. 9. As shown in FIG. 9, one repetition unit RU includes the plurality of regions A1 to A9, each including the plurality of pillars 31 having different diameters and heights according to the distance from the center P, such that the ideal phase distribution is approximated.

Figure 10:
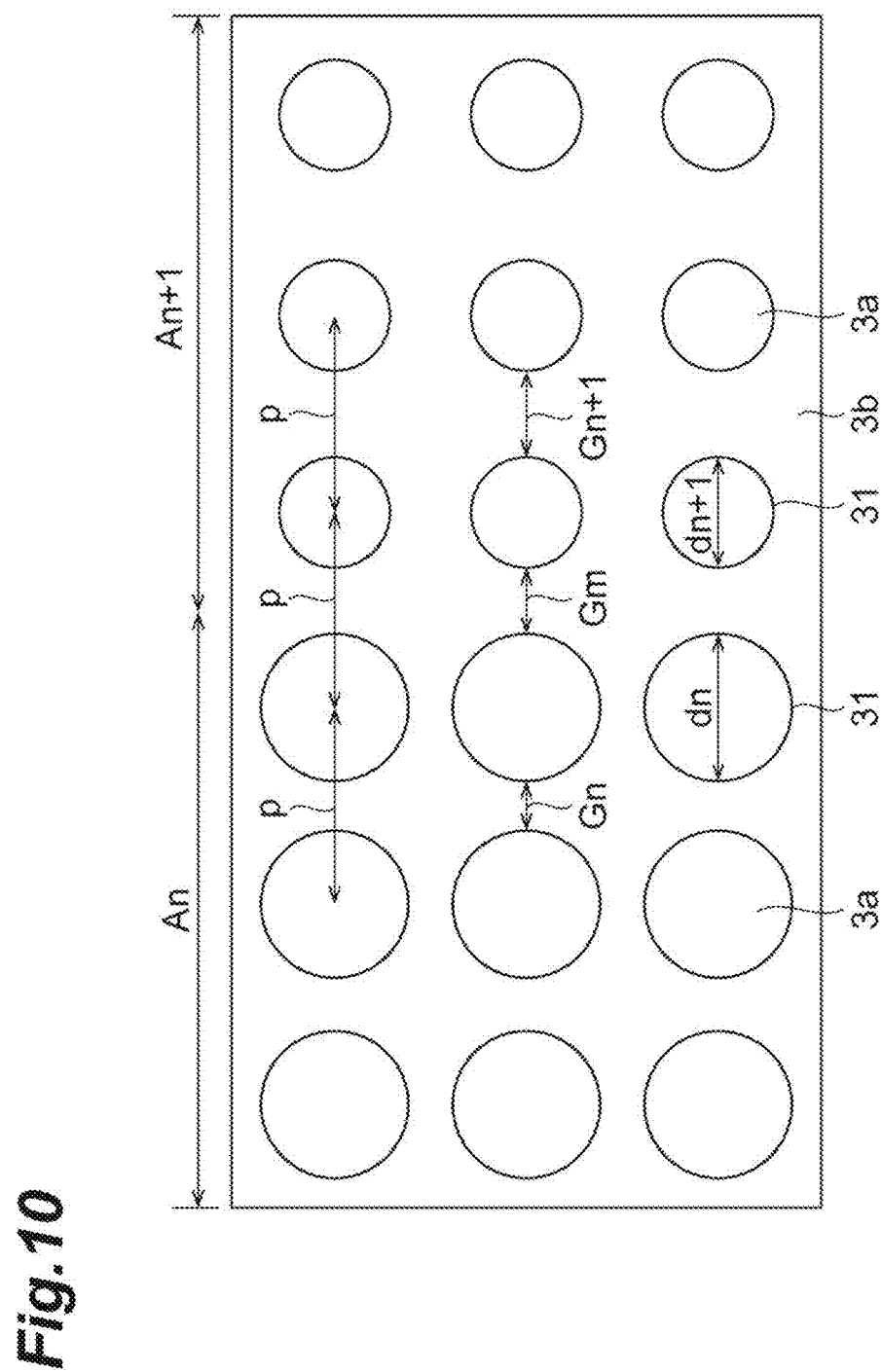
FIG. 10 is a plan view illustrating a part of an uneven structure in the vicinity of the boundary between regions adjacent to each other.

FIG. 10 is a plan view illustrating a part of the uneven structure 3 in the vicinity of the boundary between a region $A_n$ ($n^{th}$ region) and a region $A_{n+1}$ ($n+1^{th}$ region) adjacent to each other in one repetition unit RU. Here, n is any integer from 1 to N-1. Here, when the diameter of the pillar 31 corresponding to the region $A_n$ is $d_n$, the diameter of the pillar 31 corresponding to the region $A_{n+1}$ is $d_{n+1}$, the gap between the pillars 31 adjacent to each other in the region $A_n$ is $G_n$, the gap between the pillars 31 adjacent to each other in the region $A_{n+1}$ is $G_{n+1}$, and the gap between the pillar 31 in the region $A_n$ and the pillar 31 in the region $A_{n+1}$ is $G_m$, the following equations (2) to (4) are established.

$$G_n = p - d_n \qquad (2)$$

$$G_{n+1} = p - d_{n+1} \qquad (3)$$

$$G_m = p - (d_n/2 + d_{n+1}/2) \qquad (4)$$

Figure 11:
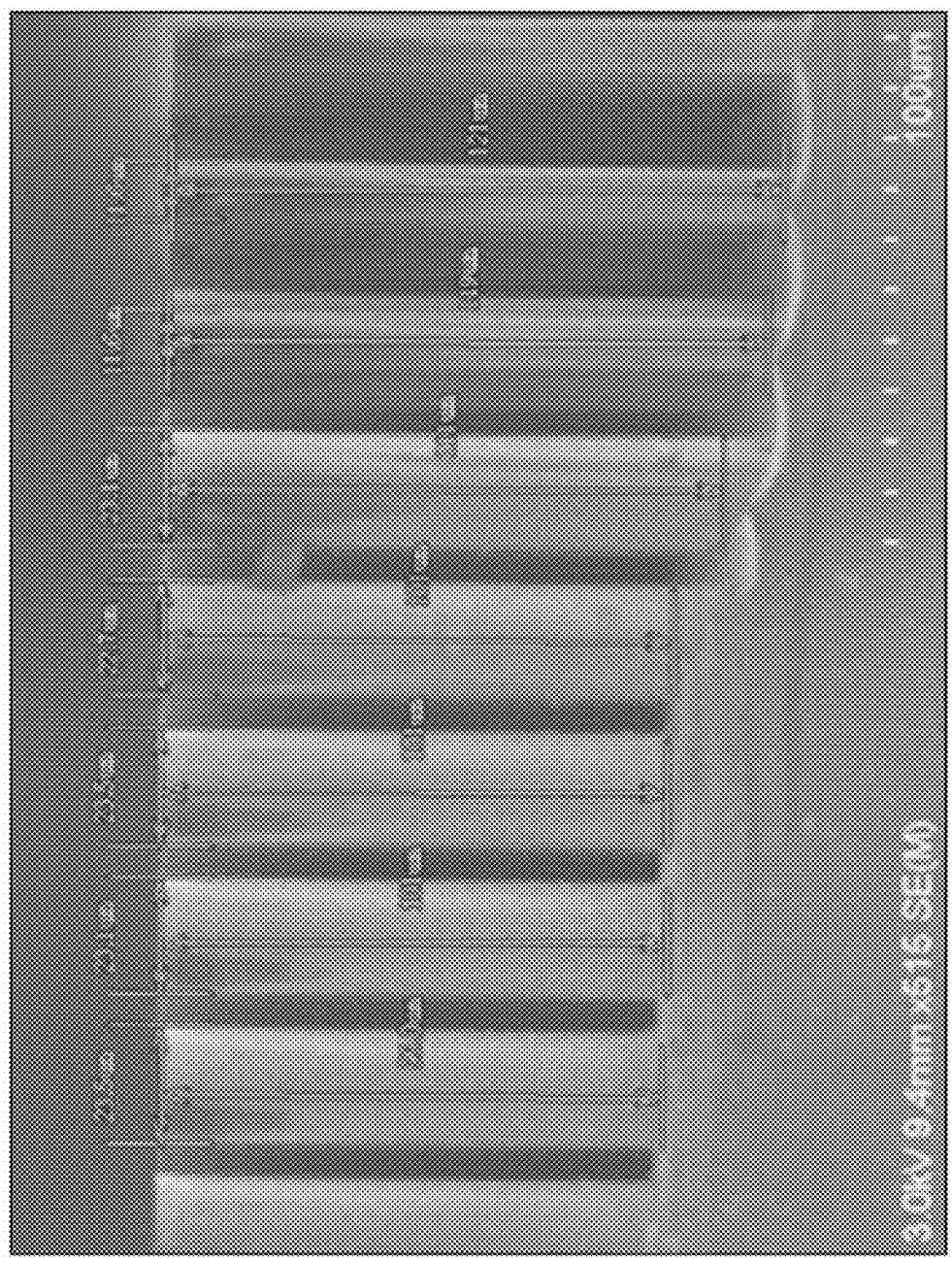
FIG. 11 is a SEM image of a part of an uneven structure in the vicinity of the boundary between regions adjacent to each other.

Here, the diameter $d_n$ is larger than the diameter $d_{n+1}$. As a result, a size relationship between the gaps $G_n$, $G_{n+1}$, and $G_m$ is "$G_n < G_m < G_{n+1}$". Namely, since the period p of the plurality of pillars 31 is constant over the entirety of the uneven structure 3, the gap $G_m$ having an intermediate size between the size of the gap $G_n$ in the region $A_n$ and the size of the gap $G_{n+1}$ in the region $A_{n+1}$ is formed between the region $A_n$ and the region $A_{n+1}$. Accordingly, the magnitude of the microloading effect occurring in the vicinity of the boundary between the region $A_n$ and the region $A_{n+1}$ is a magnitude between the magnitude of the microloading effect occurring in the region $A_n$ and the magnitude of the microloading effect occurring in the region $A_{n+1}$. As a result, the pillar 31 having a height between the height of the pillar 31 corresponding to the region $A_n$ and the height of the pillar 31 corresponding to the region $A_{n+1}$ is formed in the vicinity of the boundary between the region $A_n$ and the region $A_{n+1}$ adjacent to each other. In other words, the bottom portion 3b having a height position between the height position of the bottom portion 3b in the region $A_n$ and the height position of the bottom portion 3b in the region $A_{n+1}$ is formed in the vicinity of the boundary between the region $A_n$ and the region $A_{n+1}$. FIG. 11 is a SEM image of a part of an uneven structure in the vicinity of the boundary between regions adjacent to each other. As identified from the SEM image, in the vicinity of a portion (namely, the boundary between the regions adjacent to each other) in which the diameter of the pillar is changed, the height position of the bottom portion is not sharply changed in a step shape but is gently changed. According to the configuration, the height of the pillar 31 can be gently changed in the boundary between the region $A_n$ and the region $A_{n+1}$ adjacent to each other. Accordingly, a change in phase difference at the boundary where the region is switched from one to another region can be made gentle (continuous). As a result, an accurate lens can be obtained.

[Modification Example of Uneven Structure]

Next, a modification example (uneven structure 3A) of the uneven structure will be described with reference to FIGS. 12A to 16. The uneven structure 3A differs from the uneven structure 3 in that the uneven structure 3A includes a plurality of holes 32 (unevenness forming portions) instead of the plurality of pillars 31. The configurations of the uneven structure 3A other than that described above are the same as those of the uneven structure 3. Namely, similar to the uneven structure 3, the uneven structure 3A includes a plurality of the repetition units RU and a plurality of the regions A1 to A9 included in each of the repetition units RU. In addition, the phase distribution design of each of the regions A1 to A9 in the uneven structure 3A is the same as the above-described phase distribution design of the uneven structure 3. Namely, in the uneven structure 3A, instead of the pillars (protruding portions), the holes (recessed portions) are provided in the surface of the substrate 2 to realize the same phase distribution as that of the uneven structure 3 described above.

Figure 12A:
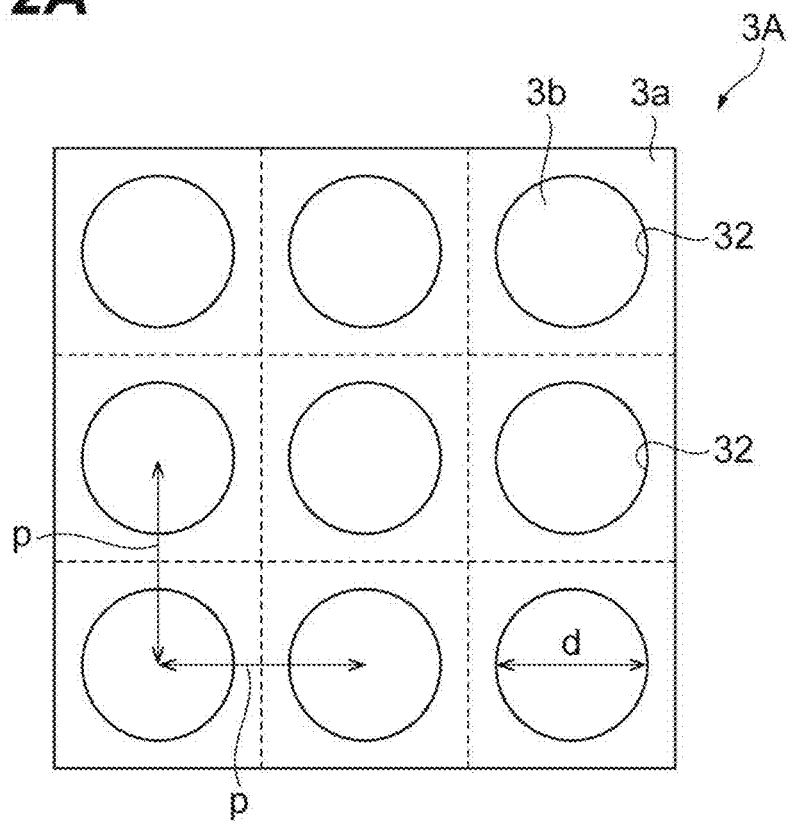
FIG. 12A is a plan view illustrating a part of an uneven structure according to a modification example.
Figure 12B:
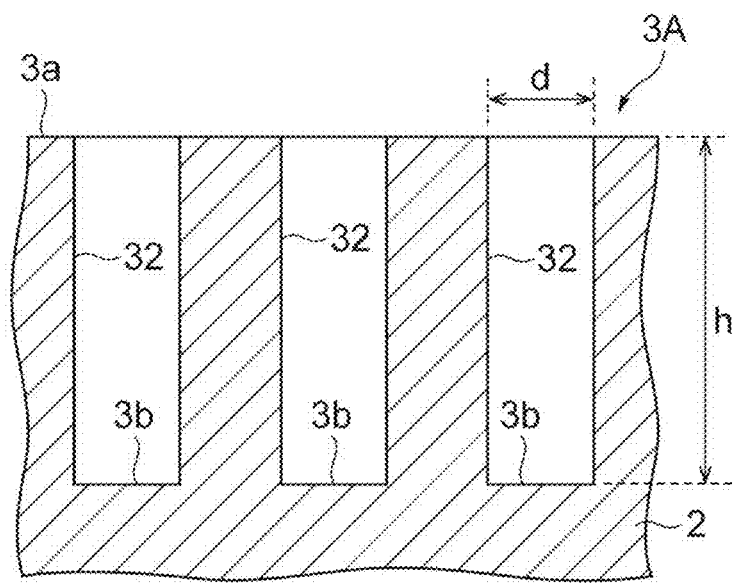
FIG. 12B is a side cross-sectional view of a part of the uneven structure according to the modification example.

In the present embodiment, as one example, the hole 32 is formed of a recessed portion (bottomed hole) that has a columnar shape and is provided in the surface of the substrate 2. As illustrated in FIG. 12A, the plurality of holes 32 are periodically arranged. Specifically, the plurality of holes 32 are arranged such that the distance (period p) between the centers of the holes 32 adjacent to each other is constant over the entirety of the uneven structure 3A. The period p is set to a period (sub-wavelength period) smaller than the wavelength (in the present embodiment, 125 μm) of a terahertz wave to be operated. The uneven structure 3A is formed of periodic structures (in the present embodiment, square regions (regions surrounded by the broken line of FIG. 12A) each including one hole 32 in a central portion) having the same area.

In the uneven structure 3A, portions of the surface of the substrate 2, the portions not being provided with the holes 32, form the outer end portions 3a of the uneven structure 3A in the thickness direction D. The outer end portions 3a of the uneven structure 3A are located on the same plane. Specifically, the outer end portions 3a of the uneven structure 3A are continuously formed along the same plane. In the uneven structure 3A, a bottom portion of each of the holes 32 forms the bottom portion 3b of the uneven structure 3A. The length in the thickness direction D between the outer end portion 3a and the bottom portion (bottom portion 3b) of the hole 32 is defined as the height h (refer to FIG. 12B) of the hole 32.

In the plurality of holes 32 arranged in the same region, the heights h in the thickness direction D coincide with each other and the widths (in the present embodiment, the diameters d (refer to FIG. 12A)) in a direction orthogonal to the thickness direction D coincide with each other in design. Namely, in the same region, the plurality of holes 32 of which the heights h and the diameters d are uniform are periodically arranged. Meanwhile, the heights h and the diameters d of the holes 32 differ between different regions of the same repetition unit RU. Namely, the height h and the diameter d of the hole 32 differ for each region.

Figure 13:
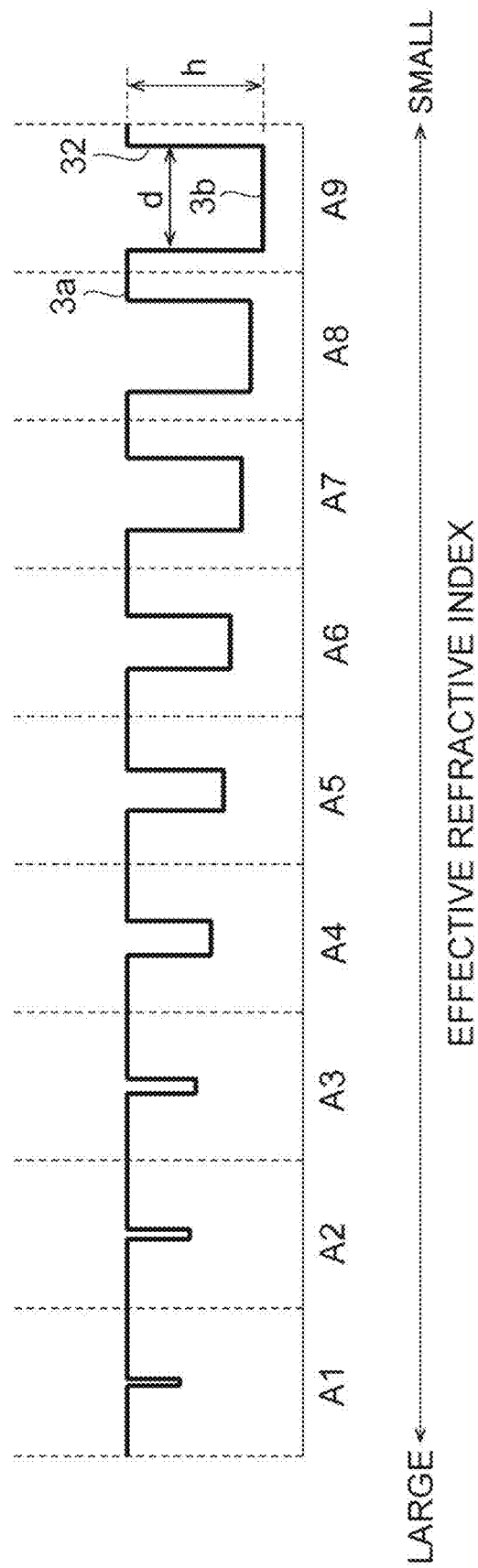
FIG. 13 is a view illustrating the heights and the widths of holes included in regions of the uneven structure according to the modification example.

As illustrated in FIG. 13, in the uneven structure 3A, the diameter d of the hole 32 belonging to each of the regions A1 to A9 is adjusted such that the filling rate (namely, an area occupied by a portion other than the hole 32 per unit area) of the material (in the present embodiment, high-resistance silicon) of the substrate 2 in each of the regions A1 to A9 is further decreased as the region is shifted from the region A1 toward the region A9. Namely, the diameter d of the hole 32 belonging to each of the regions A1 to A9 is further increased as the region is shifted from the region A1 toward the region A9. In a region where the hole 32 described above is formed, the terahertz wave senses an average refractive index (effective refractive index) of the refractive index of the portion in which the hole 32 is not formed (portion formed of high-resistance silicon that is the material of the substrate 2) and the refractive index of an air layer (layer having a lower refractive index than that of the material of the substrate 2) in the hole 32. As described above, the diameter d of the hole 32 belonging to each of the regions A1 to A9 (namely, the filling rate of silicon in each of the regions A1 to A9) is adjusted, so that the effective refractive index of the regions A1 to A9 is further decreased in a stepwise manner as the region is shifted from the region A1 toward the region A9.

In addition, the height h of the hole 32 belonging to each of the regions A1 to A9 is further increased as the region is shifted from the region A1 toward the region A9. Namely, the height positions of the bottom portions 3b of the regions A1 to A9 are further moved toward the inside of the substrate 2 as the region is shifted from the region A1 toward the region A9. As described above, since the diameter d of the hole 32 differs for each region, the effective refractive indexes of the regions A1 to A9 differ from each other, and the thickness of the uneven structure 3A (namely, the height h of the hole 32) differs for each region, so that the phase difference between the regions can be further increased.

The height h of the hole 32 is set to, for example, approximately one wavelength (125 μm) of the terahertz wave to be operated. However, the height h of the hole 32 differs for each of the regions A1 to A9 due to a microloading effect occurring during etching to be described later. In the present embodiment, as one example, in each of the repetition units RU, the maximum value of the heights h of the holes 32 (namely, the height h of the hole 32 belonging to the region A9) is approximately 125 μm, and the minimum value of the heights h of the holes 32 (namely, the height h of the hole 32 belonging to the region A1) is approximately 95 μm. In addition, the maximum value of the diameters d of the holes 32 (namely, the diameter d of the hole 32 belonging to the region A9) is approximately 25 μm, and the minimum value of the diameters d of the holes 32 (namely, the diameter d of the hole 32 belonging to the region A1) is approximately 11 μm.

Similar to the uneven structure 3, the uneven structure 3A can be produced by using, for example, the above-described photolithography technology. Namely, similar to the uneven structure 3, the uneven structure 3A can be produced by the procedure illustrated in FIG. 5. In the uneven structure 3, portions other than the portions corresponding to the pillars 31 are removed, whereas in the uneven structure 3A, portions corresponding to the holes 32 are removed by etching.

Even when the uneven structure 3A is used, similar to when the uneven structure 3 is used, the design (design of the diameter d of the hole 32 belonging to each of the regions A1 to A9) that takes into consideration the microloading effect can be performed. Specifically, instead of the information indicating the relationship between the radius of the pillar 31 and the etching depth (height of the pillar 31 obtained by etching) shown in FIG. 6, information indicating a relationship between the radius (or the diameter d) of the hole 32 and the etching depth (height of the hole 32 obtained by etching) may be acquired in advance by experiments. Then, the diameter d of the hole 32 belonging to each of the regions A1 to A9 is determined based on the information indicating the above relationship and the design value (namely, a phase difference assigned to each of the regions A1 to A9) of a phase distribution determined in advance. Namely, the diameter d of the hole 32 belonging to each of the regions A1 to A9 is determined such that the phase difference of each of the regions A1 to A9, which is determined by a combination of the height h and the diameter d of the hole 32 belonging to each of the regions A1 to A9, is a desired value (design value). Then, in the above-described production process, an etching mask (the photoresist R remaining on the surface of the substrate 2) is formed by using the photomask M in which the diameter d of the hole 32 belonging to each of the regions A1 to A9 is reflected, the diameter d being determined in such a manner (S3 and S4 of FIG. 5), anisotropic etching (S5 of FIG. 5) is performed, and finally, the etching mask is removed (S6 of FIG. 5). Accordingly, the terahertz wave lens 1 having the phase distribution as designed can be obtained. Namely, in each of the repetition units RU, the regions A1 to A9 having the phase distribution as designed can be formed.

Figure 14:
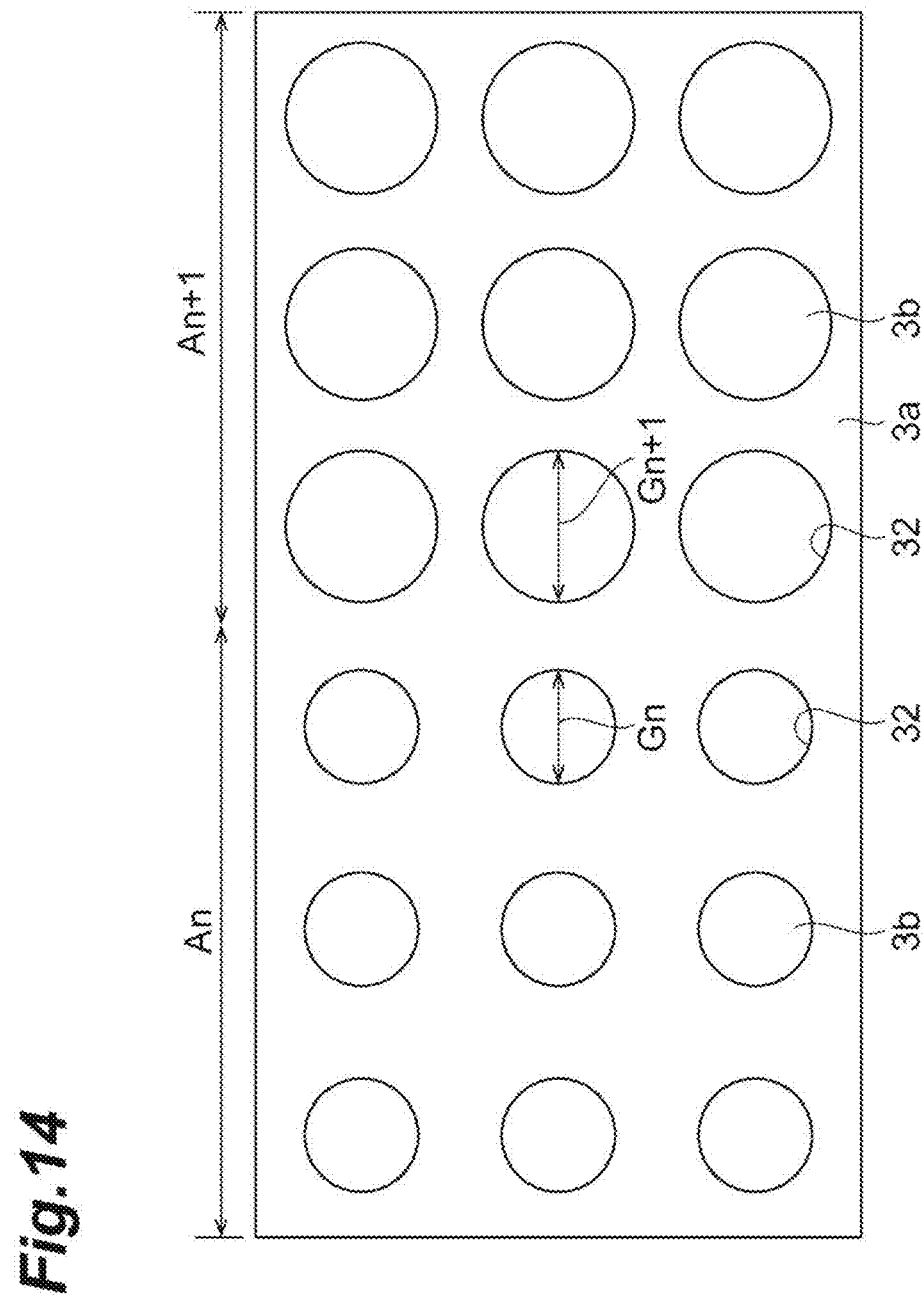
FIG. 14 is a plan view illustrating a part of the uneven structure according to the modification example in the vicinity of the boundary between regions adjacent to each other.

FIG. 14 is a plan view illustrating a part of the uneven structure 3A in the vicinity of the boundary between the region $A_n$ ($n^{th}$ region) and the region $A_{n+1}$ ($n+1^{th}$ region) adjacent to each other in one repetition unit RU. Here, n is any integer from 1 to N−1. In the uneven structure 3A, regions that are removed by etching (namely, inside of each of the holes 32) are spatially separated from each other. Namely, in the uneven structure 3 that is a pillar structure, the regions that are removed by etching are continuous to each other, whereas in the uneven structure 3A that is a hole structure, the regions that are removed by etching are separated from each other. For this reason, unlike the uneven structure 3 (refer to FIG. 10) described above, the hole 32 having an intermediate height is not formed in the vicinity of the boundary between the region $A_n$ and the region $A_{n+1}$ adjacent to each other. For this reason, unlike the uneven structure 3 described above, the uneven structure 3A does not exhibit the effect of making a gentle change in phase difference between the regions adjacent to each other in one repetition unit RU.

Meanwhile, it is preferable that the phase difference is sharply changed in a step shape at the boundary between the repetition units RU adjacent to each other (namely, the boundary where the repetition unit RU is switched from one to another repetition unit RU) as in a boundary portion between the repetition units RU having the ideal phase distribution shown in FIG. 8. Therefore, according to the uneven structure 3A, a more preferable change (namely, a step-shaped change) in phase difference can be realized at the boundary between the repetition units RU adjacent to each other.

Figure 15:
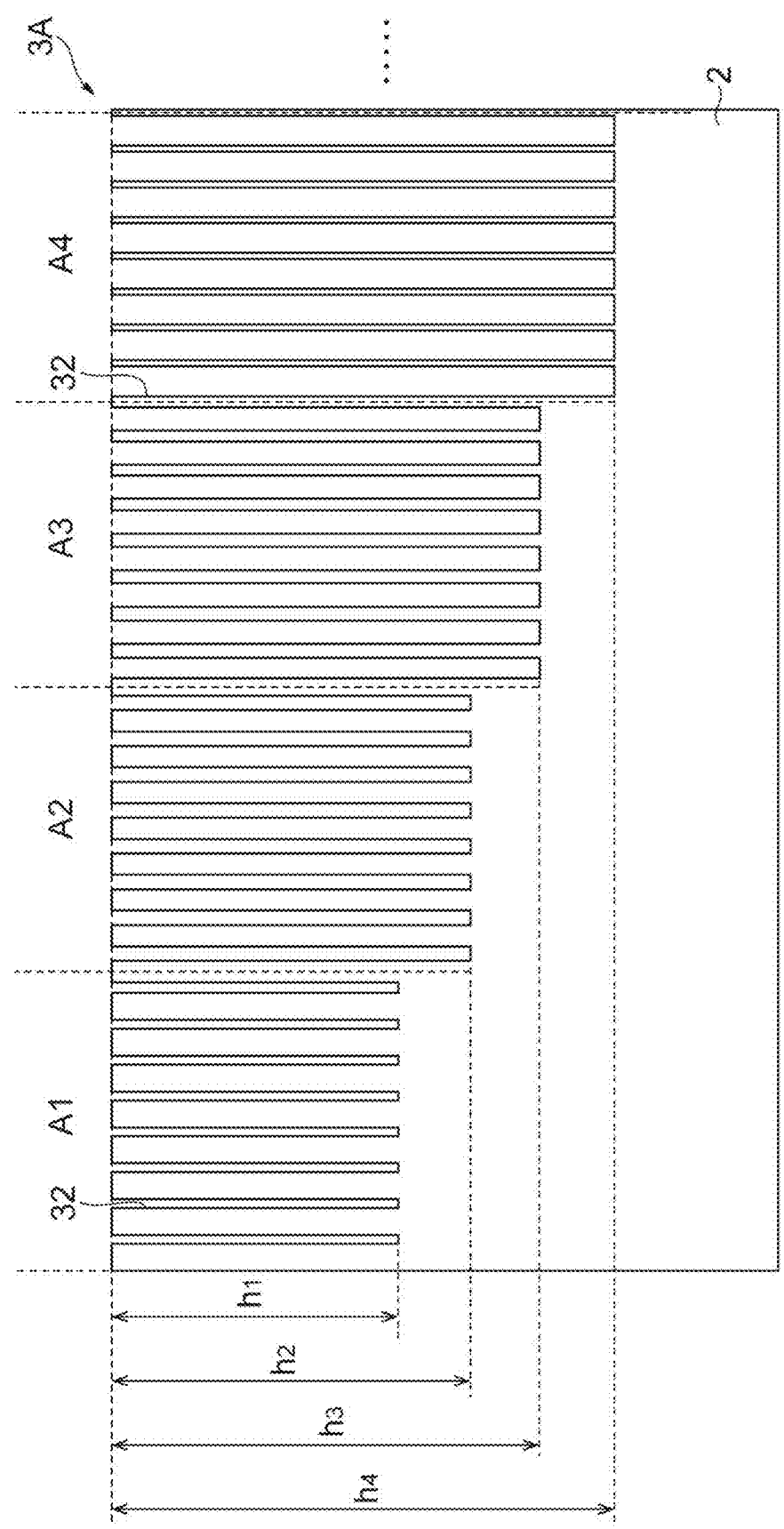
FIG. 15 is a chart schematically showing a part of the uneven structure according to the modification example.

FIG. 15 is a chart schematically showing the uneven structure 3A formed based on the above-described phase distribution design. In FIG. 15, the diameters d of the holes 32 are illustrated as being larger than actual diameters. For this reason, the number of the holes 32 belonging to each of the regions A1 to A9 shown in FIG. 15 (the number of the holes 32 along the radial direction of the substrate 2) differs from the actual number of the holes 32. Actually, each of the regions A1 to A9 includes a larger number of the holes 32 than the number of the holes 32 shown in FIG. 15.

Next, a configuration for realizing a function (hereinafter, referred to as a "non-reflection function") of suppressing the reflection of a terahertz wave at the interface (namely, a surface along which the outer end portions 3a are aligned) between the uneven structure 3 or 3A and air will be described. Such a configuration is realized by using the point that not only the diameter d but also the height h of the unevenness forming portion (the pillar 31 or the hole 32) can be changed for each of the regions A1 to A9 in the uneven structure 3 or 3A. In the following description, the case of using the uneven structure 3A shown in FIG. 15 will be described.

In the following description, the meaning of each parameter is as follows.

λ: wavelength of a terahertz wave to be operated
p: period of the hole 32 (distance between the centers of the holes 32 adjacent to each other)

$r_1$: hole radius (radius of the hole 32) of the region A1
$r_i$: hole radius of a region Ai (i≤2)
$h_1$: height in the region A1 (height of the hole 32 included in the region A1)
$h_i$: height in the region Ai (height of the hole 32 included in the region Ai)
$n_{Air}$: refractive index of an air layer
$n_{sub}$: refractive index of a portion with which the material (high-resistance silicon) of the substrate 2 is filled (namely, a portion in which the uneven structure 3A (hole 32) is not formed in the substrate 2)
$n_{eff1}$: effective refractive index of the region A1
$n_{eff2}$: effective refractive index of the region Ai When a hole radius $r_1$ is determined to be a random value, the height $h_1$ is set based on the following equation (5), so that the non-reflection function can be realized in the region A1.

$$h_1 = \frac{\lambda}{4 \cdot n_{eff1}} \tag{5}$$

Here, an effective refractive index $n_{eff1}$ of the region A1 is determined by the hole radius $r_1$ of the region A1 based on the following equation (6).

$$n_{eff1} = \sqrt{\left(\frac{\pi r_1^2}{P^2} \cdot n_{Air}^2\right) + \left(\left(1 - \frac{\pi r_1^2}{P^2}\right) \cdot n_{Sub}^2\right)} \tag{6}$$

Namely, the height $h_1$ for realizing the non-reflection function in the region A1 is determined by the hole radius $r_1$. A hole radius $r_i$ that generates a desired phase difference $\phi_i$ with respect to the region A1 and can realize the non-reflection function in any region Ai can be obtained as follows based on the premise of the above description.

First, the phase modulation amount generated in the region A1 is expressed by the following equation (7). In addition, the phase modulation amount generated in the region Ai is expressed by the following equation (8).

$$(n_{eff1} \cdot h_1) + n_{sub}(h_i - h_1) \tag{7}$$

$$(n_{eff1} \cdot h_i) \tag{8}$$

The desired phase difference $\phi_i$ is expressed from the above equations (7) and (8) by the following equation (9).

$$(n_{eff1} \cdot h_1) + n_{sub}(h_i - h_1) - (n_{effi} \cdot h_i) = \phi_i \frac{\lambda}{2\pi} \tag{9}$$

The above equation (9) is modified to obtain the following equation (10).

$$h_i \cdot (n_{sub} - n_{effi}) = \phi_i \frac{\lambda}{2\pi} - h_1(n_{eff1} - n_{Sub}) \tag{10}$$

Here, since $n_{effi}$ is expressed by the above equation (6), $n_{effi}$ can be expressed as a function "$n_{eff}(r_i)$" of the hole radius $r_i$. Furthermore, the microloading effect in the region Ai (here, a difference between the height in the region Ai and the height in the region A1 caused by the microloading effect) can be also expressed as a function "$M \cdot l(r_i)$" of the hole radius $r_i$ of the region Ai. Namely, the height in the region Ai can be expressed in the following equation (11).

$$h_i = h_1 + M \cdot l(r_i) \tag{11}$$

As a result, the following equation (12) is obtained from the above equations (10) and (11).

$$(h_1 + M \cdot l(r_i)) \cdot (n_{sub} - n_{eff}(r_i)) = \phi_i \frac{\lambda}{2\pi} - h_1(n_{eff1} - n_{Sub}) \tag{12}$$

Here, since $h_1$ and $n_{sub}$ are constants, the left side of the above equation (12) can be expressed as a function "$G(r_i)$" of which the value is determined by the hole radius $r_i$. Namely, the above equation (12) is expressed as in the following equation (13).

$$G(r_i) = \phi_i \frac{\lambda}{2\pi} - h_1(n_{eff1} - n_{Sub}) \tag{13}$$

Therefore, when the hole radius $r_i$ of the region Ai is set to satisfy the above equation (13), in the region Ai, the desired phase difference $\phi_i$ can be generated with respect to the region A1 and the non-reflection function can be realized. Namely, in the above example, first, a combination of the hole radius $r_1$ and the height $h_1$ in the region A1 is determined to satisfy the above equation (5). The hole radius $r_1$ for obtaining the above combination is determined in consideration of the microloading effect. Specifically, the hole radius $r_1$ can be determined based on information (information corresponding to the information shown in FIG. 6) indicating a relationship between the hole radius and the etching depth acquired in advance.

Subsequently, the hole radius $r_i$ of each of the regions A2 to A9 is determined to satisfy the above equation (13). Then, the above-described steps (S3 to S6 of FIG. 5) are performed using the photomask M in which the hole radius $r_i$ determined in such a manner is reflected, so that the terahertz wave lens 1 having the non-reflection function in each of the regions A1 to A9 can be obtained.

Incidentally, here, the case of using the uneven structure 3A has been described; however, even when the uneven structure 3 is used, the non-reflection function can be realized in each of the regions A1 to A9 according to the same approach described above. Specifically, when the uneven structure 3 is used, an equation that is similar to the above equation (13) and has a function of the radius of the pillar 31 of the region Ai on the left side can be derived. Then, the radius of the pillar 31 which satisfies the equation is calculated for each region and the above-described steps (S3 to S6 of FIG. 5) are performed using the photomask M in which the calculated radius of the pillar 31 is reflected, so that the terahertz wave lens 1 having the non-reflection function in each of the regions A1 to A9 can be obtained.

[Effects]

In the terahertz wave lens 1 described above, the height h and the diameter d of the unevenness forming portion (the pillar 31 in the case of the uneven structure 3 and the hole 32 in the case of the uneven structure 3A) forming the uneven structure 3 or 3A differ for each of the regions A1 to A9. Accordingly, a phase difference that differs for each of the regions A1 to A9 can be generated for a terahertz wave transmitted through the substrate 2. In addition, since the substrate 2 on the surface of which the uneven structure 3 or 3A is formed is used to be able to further reduce the thickness of the lens than that of a spherical lens or the like, the size of the lens can be reduced. Furthermore, since the height positions of the outer end portions 3a of the uneven structure 3 or 3A in the thickness direction D are aligned, the occurrence of an aberration can be suppressed.

In addition, in the terahertz wave lens 1, since the distance (period p) between the centers of the unevenness forming portions (the pillars 31 or the holes 32) adjacent to each other is constant, the design of the arrangement of the unevenness forming portions is facilitated. Specifically, when the period p of the unevenness forming portions is constant, since the above-described periodic structures (in the present embodiment, square regions each including one unevenness forming portion in a central portion) having a constant area may be regularly (in the present embodiment, in a grid pattern) arranged on a plane, the layout of the unevenness forming portions can be easily designed. Meanwhile, when the period p of the unevenness forming portions is not constant (for example, when the period p differs according to the diameter d of the unevenness forming portion), the size of the above-described periodic structure differs for each of the regions A1 to A9. In this case, a gap (gap between the periodic structures having different sizes) occurs in the vicinity of the boundary where the region is switched from one to another region, and the effective refractive index (phase difference) in the portion of the gap may deviate from the design value. In addition, in a situation where the periodic structures having different sizes are mixed in the regions A1 to A9, it is difficult to find out an optimum arrangement of the periodic structures in which such a gap does not occur (or the gap is very small). Since the period p is constant, such a problem can be avoided.

In addition, when the unevenness forming portion is the pillar 31 (namely, when the terahertz wave lens 1 includes the uneven structure 3), the larger the diameter d of the pillar 31 is, the lower the height h of the pillar 31 is (refer to FIG. 4). According to the configuration, since the microloading effect in etching is used, the uneven structure 3 where the height h and the diameter d of the pillar 31 differ for each of the regions A1 to A9 can be easily formed.

In addition, when the unevenness forming portion is the hole 32 (namely, when the terahertz wave lens 1 includes the uneven structure 3A), the larger the diameter d of the hole 32 is, the higher the height h of the hole 32 is (refer to FIG. 13). According to the configuration, since the microloading effect in etching is used, the uneven structure 3A where the height h and the diameter d of the hole 32 differ for each of the regions A1 to A9 can be easily formed.

In addition, the plurality of regions included in one repetition unit RU are formed of nine regions from the region A1 to the region A9 that are arranged along the predetermined direction (in the present embodiment, the radial direction of the substrate 2 having a disk shape). Then, the effective refractive index of the plurality of regions A1 to A9 is further decreased in a stepwise manner as the region is shifted from the region A1 toward the region A9. According to the configuration, since the plurality of regions are arranged such that the effective refractive index is further decreased in a stepwise manner as the region is shifted from the region A1 toward the region A9, the terahertz wave lens 1 can serve as a refractive index distribution type lens.

In addition, the height h of the unevenness forming portion (the pillar 31 or the hole 32) belonging to each of the regions A1 to A9 is further increased as the region is shifted from the region A1 toward the region A9. According to the configuration, the phase difference between the regions A1 to A9 can be more efficiently generated than when only the diameter d of the unevenness forming portion differs for each of the regions A1 to A9.

In addition, the plurality of regions A1 to A9 include first phase difference regions (in the present embodiment, the regions A3 to A9) where the phase difference between the regions adjacent to each other is set to the first phase difference, and second phase difference regions (in the present embodiment, the regions A1 and A2) where the phase difference between the regions adjacent to each other is set to the second phase difference smaller than the first phase difference. According to the configuration, the phase distribution design can be more flexibly performed than when the phase differences between the regions are equal (normal phase distribution design shown in FIG. 8).

In addition, when the unevenness forming portion is the pillar 31 (namely, when the terahertz wave lens 1 includes the uneven structure 3), at least one region (in the present embodiment, the regions A1 and A2) where the diameter d of the pillar 31 in the uneven structure 3 is the threshold value Δd determined in advance or more may be the second phase difference region. According to the same approach, when the unevenness forming portion is the hole 32 (namely, the terahertz wave lens 1 includes the uneven structure 3A), at least one region where the diameter d of the hole 32 in the uneven structure 3A is a threshold value determined in advance or less may be the second phase difference region. According to the configuration, in a portion in which the microloading effect is relatively remarkable and it is difficult to accurately produce the unevenness forming portion (the pillar 31 or the hole 32) having the diameter d and the height h corresponding to the phase distribution designed in advance, the step size of the phase difference between the regions is made small, so that a deviation (production error) of the phase distribution from the design value can be compensated.

In addition, the height h and the diameter d of the unevenness forming portion (the pillar 31 or the hole 32) corresponding to each of the plurality of regions A1 to A9 are sized so as to be able to suppress the reflection of a terahertz wave at the interface between the uneven structure 3 or 3A and air. According to the configuration, since a reflection prevention layer is not required to be provided separately from the unevenness forming portion, the reflection of a terahertz wave at the interface between the uneven structure 3 or 3A and air can be suppressed while an increase in size of the terahertz wave lens 1 is prevented.

In addition, as described above, a method for producing the terahertz wave lens 1 according to the present embodiment includes a first step of determining a pattern of the uneven structure 3 or 3A (design that takes into consideration the microloading effect described using FIGS. 6 and 7); a second step of forming an etching mask (photoresist R) on the surface of the substrate 2 which is flat, according to the pattern (refer to S2 to S4 of FIG. 5); a third step of performing anisotropic etching on the substrate 2 in a state where the etching mask is formed on the surface of the substrate 2, to form the uneven structure 3 or 3A in the surface of the substrate 2 (refer to S5 of FIG. 5); and a fourth step of removing the etching mask from the surface of the substrate 2 (refer to S6 of FIG. 5). According to the production method, the terahertz wave lens 1 exhibiting the above-described effects can be produced. In addition, since the surface of the substrate 2 is etched with the etching mask, the height positions (outer end portions 3a) of portions covered with the etching mask (namely, portions that are not removed by etching) can be aligned to a constant position. In addition, since the microloading effect in etching is used, a structure where both of the height h and the diameter d of the unevenness forming portion differ for each of the regions A1 to A9 can be easily produced.

In addition, in the first step, the pattern of the uneven structure 3 or 3A is determined such that the amount of etching per unit area of each of the plurality of regions A1 to A9 is further increased as the region is shifted from the region A1 toward the region A9. Namely, when the uneven structure 3 is used, the pattern of the uneven structure 3 is determined such that the diameter d of the pillar 31 is further decreased as the region is shifted from the region A1 toward the region A9 (refer to FIG. 4). In addition, when the uneven structure 3A is used, the pattern of the uneven structure 3A is determined such that the diameter d of the hole 32 is further increased as the region is shifted from the region A1 toward the region A9. According to the configuration, the plurality of regions A1 to A9 where the effective refractive index is further decreased in a stepwise manner as the region is shifted from the region A1 toward the region A9 can be formed, and the terahertz wave lens 1 serving as a refractive index distribution type lens can be obtained.

In addition, the first step includes a step of acquiring information (refer to FIG. 6) indicating a relationship between the diameter d of the unevenness forming portion (the pillar 31 or the hole 32) and the etching depth, and a step of determining the diameter d of the unevenness forming portion, which is arranged in each of the regions A1 to A9, based on the information indicating the above relationship and the design value (phase distribution design of the embodiment in FIG. 8) of the phase distribution determined in advance. According to the configuration, since the diameter d of the unevenness forming portion of each of the regions A1 to A9 is determined in consideration of the relationship between the diameter d of the unevenness forming portion and the etching depth (namely, the magnitude of the influence of the microloading effect), the occurrence of a production error (deviation from the design value) caused by the microloading effect can be suppressed.

In addition, in the first step, the diameter d of the unevenness forming portion (the pillar 31 or the hole 32) arranged in each of the regions A1 to A9 is determined such that the plurality of regions A1 to A9 include first phase difference regions (in the present embodiment, regions where the phase difference is set with a step of $\pi/4$) and second phase difference regions (regions where a phase difference smaller than $\pi/4$ is set). According to the configuration, the phase distribution design can be more flexibly performed than when the phase differences between the regions A1 to A9 are equal.

In addition, when the uneven structure 3 is used, in the first step, the diameter d of the pillar 31 arranged in each of the regions A1 to A9 may be determined such that at least one region (in the present embodiment, the regions A1 and A2) where the diameter d of the pillar 31 in the uneven structure 3 is the threshold value $\Delta d$ determined in advance or more is the second phase difference region. In addition, when the uneven structure 3A is used, in the first step, the diameter d of the hole 32 arranged in each of the regions A1 to A9 may be determined such that at least one region where the diameter d of the hole 32 in the uneven structure 3A is the threshold value determined in advance or less is the second phase difference region. In addition, in the first step, the diameter d of the unevenness forming portion (the pillar 31 or the hole 32) arranged in each of the regions A1 to A9 may be determined such that at least the region A1 forms the second phase difference region. According to the configuration, in a portion in which the microloading effect is relatively remarkable and it is difficult to accurately produce the unevenness forming portion having the diameter d and the height h corresponding to the phase distribution designed in advance, the step size of the phase difference between the regions A1 to A9 is made small, so that a deviation (production error) of the phase distribution from the design value can be compensated.

In addition, in the first step, the diameter d of the unevenness forming portion (the pillar 31 or the hole 32) arranged in each of the regions A1 to A9 is determined such that at least one of the plurality of repetition units RU has a phase distribution having a width larger than $2\pi$. According to the configuration, it is possible to obtain the terahertz wave lens 1 which reduces a possibility that the width of the actual phase distribution is smaller than $2\pi$ in the repetition unit RU formed to have a phase distribution having a width larger than $2\pi$.

In addition, in the first step, the diameter d of the unevenness forming portion arranged in each of the regions A1 to A9 is determined such that the height h and the diameter d of the unevenness forming portion (the pillar 31 or the hole 32) corresponding to each of the plurality of regions A1 to A9 are sized so as to be able to suppress the reflection of a terahertz wave at the interface between the uneven structure 3 or 3A and air. According to the configuration, the terahertz wave lens 1 in which the above-described non-reflection function is exhibited in each of the regions A1 to A9 can be obtained.

Modification Examples

The exemplary embodiment of the present disclosure has been described above; however, the present disclosure is not limited to the embodiment. For example, the material and the shape of each configuration are not limited to the above-described example.

In addition, in the uneven structure 3, the pillar 31 may not have a columnar shape. For example, the uneven structure 3 may include pillars having a prismatic shape (for example, a quadrangular prism shape). In this case, instead of the diameter d, the length of one side of the pillar may be used as the width of the pillar. Similarly, in the uneven structure 3A, the hole 32 may not have a columnar shape. For example, the uneven structure 3A may include holes having a prismatic shape (for example, a quadrangular prism shape). In this case, instead of the diameter d, the length of one side of the hole may be used as the width of the hole.

In addition, the periodic structures that have the same area and are formed of a plurality of the unevenness forming portions (the pillars 31 or the holes 32) may not necessarily be square regions. For example, the plurality of unevenness forming portions may be arranged in a triangular grid pattern. In this case, the periodic structures having the same area may be regular hexagonal regions.

In addition, the distance (period p) between the centers of the unevenness forming portions adjacent to each other may not necessarily be constant. However, since the distance between the centers of the unevenness forming portions is constant, as described above, there is an advantage that the design of the arrangement of the unevenness forming portions is facilitated.

Figure 16:
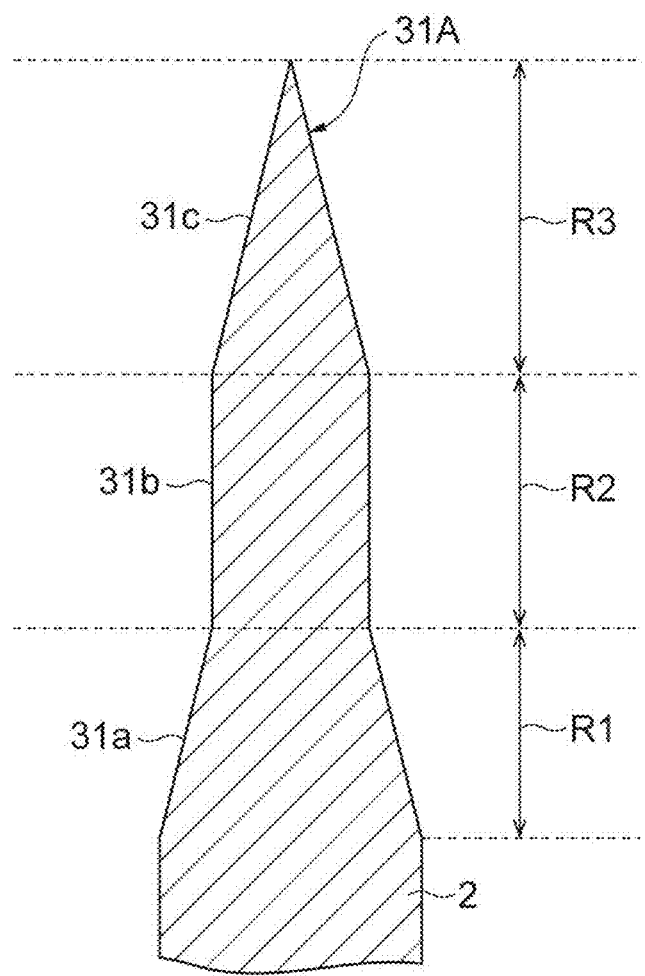
FIG. 16 is a view illustrating a modification example of the pillar.

In addition, the uneven structure 3 may include a pillar 31A illustrated in FIG. 16, instead of the pillar 31. The pillar 31A includes a portion 31b having the same columnar shape as that of the pillar 31, a portion 31a arranged between a portion of the substrate 2 which excludes the uneven structure 3 (hereinafter, simply referred to as the "substrate 2") and the portion 31b, and a portion 31c arranged outside the portion 31b (on a side opposite a portion 31a side). The portion 31b is a portion serving as a phase modulation layer R2 similar to the pillar 31. Meanwhile, the portion 31a and the portion 31c are portions serving as reflection prevention layers R1 and R3 due to having a moth-eye structure. Specifically, the portion 31a is formed in a truncated cone shape that is tapered from a substrate 2 side toward a portion 31b side. The portion 31c is formed in a conical shape that is tapered from the portion 31b side toward the outside (air layer side). The portion 31a can suppress the reflection of a terahertz wave at the boundary between the substrate 2 and the phase modulation layer R2. The portion 31c can suppress the reflection of a terahertz wave at the boundary between the phase modulation layer R2 and an air layer. Incidentally, the portion 31b may be formed in a prismatic shape (for example, a quadrangular prism shape). In this case, the portion 31a may be formed in a truncated pyramid shape, and the portion 31c may be formed in a pyramidal shape.

Figure 17:
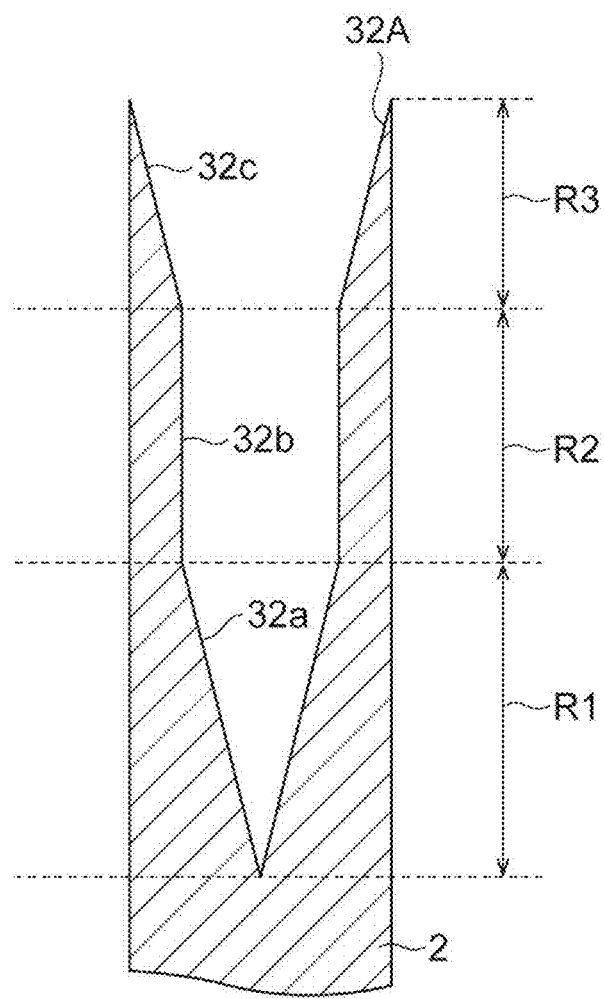
FIG. 17 is a view illustrating a modification example of the hole.

In addition, the uneven structure 3A may include a hole 32A illustrated in FIG. 17, instead of the hole 32. The hole 32A includes a portion 32b having the same columnar shape as that of the hole 32, a portion 32a arranged between a portion of the substrate 2 which excludes the uneven structure 3A (hereinafter, simply referred to as the "substrate 2") and the portion 32b, and a portion 32c arranged outside the portion 32b (on a side opposite a portion 32a side). The portion 32b is a portion serving as the phase modulation layer R2 similar to the hole 32. Meanwhile, the portion 32a and the portion 32c are portions serving as the reflection prevention layers R1 and R3 due to having a moth-eye structure. Specifically, the portion 32a is formed in a conical shape that is tapered from a portion 32b side toward a substrate 2 side. The portion 32c is formed in a truncated cone shape that is tapered from the outside (air layer side) toward the portion 32b side. The portion 32a can suppress the reflection of a terahertz wave at the boundary between the substrate 2 and the phase modulation layer R2. The portion 32c can suppress the reflection of a terahertz wave at the boundary between the phase modulation layer R2 and an air layer. Incidentally, the portion 32b may be formed in a prismatic shape (for example, a quadrangular prism shape). In this case, the portion 32a may be formed in a truncated pyramid shape, and the portion 32c may be formed in a pyramidal shape.

In addition, in the embodiment, the terahertz wave lens 1 in which the plurality of repetition units RU are concentrically with respect to the center (center P) of the lens is provided as an example; however, the form of the terahertz wave lens according to the present disclosure is not limited to the above form. For example, the terahertz wave lens according to the present disclosure may exhibit a lens function only in one axial direction like a cylindrical lens. For example, the repetition units RU and the plurality of regions A1 to A9 included in the repetition unit RU may be formed in a rectangular shape and may be arranged along one axial direction.

In addition, in the embodiment, the terahertz wave lens serving as a convex lens is provided as one example of a terahertz wave optical element; however, when the distribution of the effective refractive indexes (namely, the shape and the arrangement of the plurality of unevenness forming portions) in the uneven structure is adjusted, the terahertz wave lens including the substrate and the uneven structure described above may serve as a concave lens. In addition, the terahertz wave optical element including the substrate and the uneven structure described above is not limited to the terahertz wave lens. For example, the terahertz wave optical element according to the present disclosure may be an optical element other than lenses such as a polarizing plate, a wave plate, and a diffraction grating.

REFERENCE SIGNS LIST

1: terahertz wave lens (terahertz wave optical element), 2: substrate, 3, 3A: uneven structure, 3a: outer end portion, 31, 31A: pillar (unevenness forming portion and protruding portion), 32, 32A: hole (unevenness forming portion and recessed portion), A1 to A9: region, D: thickness direction, RU: repetition unit.

What is claimed is:
1. A terahertz wave optical element comprising:
a substrate having a surface provided with an uneven structure that changes a phase of a terahertz wave,
wherein the uneven structure includes a plurality of unevenness forming portions formed of recessed portions that are periodically arranged,
the uneven structure includes a plurality of regions where the plurality of unevenness forming portions are arranged,
a height of the unevenness forming portion in a thickness direction of the substrate and a width of the unevenness forming portion in a direction orthogonal to the thickness direction differ for each of the regions,
outer end portions of the uneven structure in the thickness direction are located on the same plane,
the plurality of regions are formed of N, N is an integer of 2 or more, regions including a first region to an $N^{th}$ region that are arranged along a predetermined direction, and
an effective refractive index of each of the plurality of regions is further decreased in a stepwise manner as the region is shifted from the first region toward the $N^{th}$ region.

2. The terahertz wave optical element according to claim 1,
wherein a distance between centers of the unevenness forming portions adjacent to each other is constant.

3. The terahertz wave optical element according to claim 1,
wherein the larger the width of the unevenness forming portion is, the higher the height of the unevenness forming portion is.

4. The terahertz wave optical element according to claim 1,
wherein the height of the unevenness forming portion belonging to each of the regions is further increased as the region is shifted from the first region toward the $N^{th}$ region.

5. The terahertz wave optical element according to claim 1,
wherein the plurality of regions include a first phase difference region where a phase difference between the regions adjacent to each other is set to a first phase difference, and a second phase difference region where a phase difference between the regions adjacent to each other is set to a second phase difference smaller than the first phase difference.

6. The terahertz wave optical element according to claim 5,
wherein at least one of the regions, in which the width of the unevenness forming portion in the uneven structure is a threshold value determined in advance or less, is the second phase difference region.

7. The terahertz wave optical element according to claim 5,
wherein at least the first region forms the second phase difference region.

8. The terahertz wave optical element according to claim 1,
wherein the unevenness forming portion includes a plurality of repetition units each including one set of the plurality of regions,
the plurality of repetition units are arranged along the predetermined direction, and
at least one of the plurality of repetition units is formed to have a phase distribution having a width larger than $2\pi$.

9. The terahertz wave optical element according to claim 1,
wherein the height and the width of the unevenness forming portion corresponding to each of the plurality of regions are sized so as to suppress reflection of the terahertz wave at an interface between the uneven structure and air.

10. A method for producing a terahertz wave optical element, the method comprising:
a first step of determining a pattern of an uneven structure that changes a phase of a terahertz wave;
a second step of forming an etching mask, which corresponds to the pattern, on a surface of a substrate that is flat;
a third step of performing anisotropic etching on the substrate in a state where the etching mask is formed on the surface of the substrate, to form the uneven structure in the surface of the substrate, the uneven structure including a plurality of unevenness forming portions formed of recessed portions that are periodically arranged; and
a fourth step of removing the etching mask from the surface of the substrate,
wherein the uneven structure includes a plurality of regions where the plurality of unevenness forming portions are arranged,
a height of the unevenness forming portion in a thickness direction of the substrate and a width of the unevenness forming portion in a direction orthogonal to the thickness direction differ for each of the regions,
wherein in the first step, the pattern of the uneven structure is determined such that the plurality of regions are formed of N, N is an integer of 2 or more, regions including a first region to an $N^{th}$ region that are arranged along a predetermined direction, and an amount of etching per unit area of each of the plurality of regions is further increased in a stepwise manner as the region is shifted from the first region toward the $N^{th}$ region.

11. The method for producing a terahertz wave optical element according to claim 10, wherein in the first step, the pattern of the uneven structure is determined such that a distance between centers of the unevenness forming portions adjacent to each other is constant.

12. The method for producing a terahertz wave optical element according to claim 10,
wherein the first step includes a step of acquiring information indicating a relationship between the width of the unevenness forming portion and an etching depth, and a step of determining the width of the unevenness forming portion, which is arranged in each of the regions, based on the information indicating the relationship and a design value of a phase distribution determined in advance.

13. The method for producing a terahertz wave optical element according to claim 10,
wherein in the first step, the width of the unevenness forming portion arranged in each of the regions is determined such that the plurality of regions include a first phase difference region and a second phase difference region,
the first phase difference region is a region where a phase difference between the regions adjacent to each other is set to a first phase difference, and
the second phase difference region is a region where a phase difference between the regions adjacent to each other is set to a second phase difference smaller than the first phase difference.

14. The method for producing a terahertz wave optical element according to claim 13,
wherein in the first step, the width of the unevenness forming portion arranged in each of the regions is determined such that at least one of the regions, in which the width of the unevenness forming portion in the uneven structure is a threshold value determined in advance or less, is the second phase difference region.

15. The method for producing a terahertz wave optical element according to claim 13,
wherein in the first step, the width of the unevenness forming portion arranged in each of the regions is determined such that at least the first region forms the second phase difference region.

16. The method for producing a terahertz wave optical element according to claim 10,
wherein in the first step, the width of the unevenness forming portion arranged in each of the regions is determined such that the unevenness forming portion includes a plurality of repetition units each including one set of the plurality of regions, the plurality of repetition units are arranged along the predetermined direction, and at least one of the plurality of repetition units has a phase distribution having a width larger than $2\pi$.

17. The method for producing a terahertz wave optical element according to claim 10,
wherein in the first step, the width of the unevenness forming portion arranged in each of the regions is determined such that the height and the width of the unevenness forming portion corresponding to each of the plurality of regions are sized so as to suppress reflection of the terahertz wave at an interface between the uneven structure and air.

* * * * *